United States Patent
Ghanbarinejad et al.

(10) Patent No.: US 12,389,418 B2
(45) Date of Patent: Aug. 12, 2025

(54) RESOURCE ATTRIBUTE CONFIGURATION

(71) Applicant: Lenovo (Singapore) PTE. LTD., New Tech Park (SG)

(72) Inventors: Majid Ghanbarinejad, Chicago, IL (US); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 400 days.

(21) Appl. No.: 17/916,685

(22) PCT Filed: Apr. 1, 2021

(86) PCT No.: PCT/IB2021/052758
§ 371 (c)(1),
(2) Date: Oct. 3, 2022

(87) PCT Pub. No.: WO2021/198989
PCT Pub. Date: Oct. 7, 2021

(65) Prior Publication Data
US 2023/0164793 A1    May 25, 2023

Related U.S. Application Data

(60) Provisional application No. 63/004,192, filed on Apr. 2, 2020.

(51) Int. Cl.
*H04W 72/23* (2023.01)
*H04W 72/52* (2023.01)

(52) U.S. Cl.
CPC ........... *H04W 72/23* (2023.01); *H04W 72/52* (2023.01)

(58) Field of Classification Search
CPC ... H04L 5/0053; H04L 5/0094; H04L 5/1469; H04W 16/11; H04W 16/115;
(Continued)

(56) References Cited

U.S. PATENT DOCUMENTS 12,185,280 B2 * 12/2024 Yokomakura ......... H04W 72/23
2019/0305923 A1 * 10/2019 Luo ....................... H04W 72/20
(Continued)

FOREIGN PATENT DOCUMENTS

CN    111901871 A    11/2020
WO    2020/032578 A1   2/2020

OTHER PUBLICATIONS

"3rd Generation Partnership Project; Technical Specification Group Radio Access Network; NR; Study on Integrated Access and Backhaul; (Release 16)," 3GPP TR 38.874 V16.0.0, Dec. 2018, pp. 1-111 (Year: 2018).*
(Continued)

*Primary Examiner* — Thomas R Cairns
(74) *Attorney, Agent, or Firm* — Kunzler Bean & Adamson

(57) ABSTRACT

Apparatuses, methods, and systems are disclosed for resource attribute configuration. One method includes receiving a first configuration for a resource. The first configuration includes a first parameter indicating a time-domain attribute associated with the resource, and the time-domain attribute is hard, soft, and/or unavailable. The method includes receiving a second configuration for the resource. The second configuration includes a second parameter indicating a frequency-domain attribute associated with the resource, and the frequency-domain attribute is hard, soft, and/or unavailable. The method includes determining an attribute for the resource based on the time-domain attribute and the frequency-domain attribute. The
(Continued)

attribute is hard, soft, and/or unavailable. The method includes, in response to determining that the attribute is soft: determining whether the resource is indicated as available; and performing an operation on the resource.

20 Claims, 23 Drawing Sheets

(58) Field of Classification Search
CPC ......... H04W 16/20; H04W 16/23–232; H04W 16/27–29; H04W 16/40; H04W 16/52; H04W 84/047; H04W 92/02
See application file for complete search history.

(56) References Cited

U.S. PATENT DOCUMENTS

| | | | |
|---|---|---|---|
| 2021/0345303 A1* | 11/2021 | Ying | H04W 72/04 |
| 2022/0061006 A1* | 2/2022 | Liu | H04W 72/23 |
| 2022/0191863 A1* | 6/2022 | Miao | H04L 5/0053 |

OTHER PUBLICATIONS

PCT/IB2021/052668, "Notification of Transmittal of the International Search Report and the Written Opinion of the International Searching authority, or the Declaration", International Searching Authority, Jun. 29, 2021, pp. 1-15.

Intel Corporation, "Overview on RAN1 related issues in IAB", 3GPP TSG RAN WG1 #92bis R1-1804755, Apr. 16-Apr. 20, 2018, pp. 1-15.

Intel Corporation, "Phy layer enhancement for Nr Iab" 3GPP Tsg Ran WG1 #93 R1-1806551, May 21-May 25, 2018, pp. 1-17.

Huawei, Hisilicon, "Physical layer design for NR IAB", 3GPP TSG RAN WG1 Meeting #94 R1-1808101, Aug. 20-24, 2018, pp. 1-14.

Lenovo, Motorola Mobility, "Discussion on resource partitioning for IAB network", 3GPP TSG RAN WG1 Meeting #94 R1-1808551, Aug. 20-24, 2018, pp. 1-3.

CMCC, "Discussions on enhancements to support NR Backhaul links", 3GPP TSG RAN WG1 Meeting #94 R1-1808836, Aug. 20-24, 2018, pp. 1-9.

Qualcomm Incorporated, "Enhancements to support NR backhaul links", 3GPP TSG RAN WG1 Meeting #94 R1-1809442, Aug. 20-24, 2018, pp. 1-19.

Lenovo, Motorola Mobility, "Discussion on resource partitioning for IAB network" 3GPP TSG RAN WG1 Ad-Hoc Meeting 1901 R1-1900394, Jan. 21-25, 2019, pp. 1-8.

Moderator (At&T), "Summary of [104-e-NR-eIAB-01]—3rd Checkpoint", 3GPP TSG RAN WG1 #104-e R1-2101891, Jan. 25-Feb. 5, 2021, pp. 1-51.

Qualcomm, "New WID on Enhancements to Integrated Access and Backhaul", 3GPP TSG RAN Meeting #86 RP-193251, Dec. 9-12, 2019, pp. 1-5.

3GPP, "3rd Generation Partnership Project; Technical Specification Group Radio Access Network; NR; Physical channels and modulation (Release 16)", 3GPP TS 38.211 V16.0.0, Dec. 2019, pp. 1-129.

3GPP, 3rd Generation Partnership Project; Technical Specification Group Radio Access Network; NR; Physical layer procedures for control (Release 15), 3GPP TS 38.213 V15.7.0, Sep. 2019, pp. 1-108.

3GPP, "3rd Generation Partnership Project; Technical Specification Group Radio Access Network; NR; Physical layer procedures for data (Release 16)", 3GPP TS 38.214 V16.0.0, Dec. 2019, pp. 1-147.

3GPP, "3rd Generation Partnership Project; Technical Specification Group Radio Access Network; NR; User Equipment (UE) radio access capabilities (Release 15)", 3GPP TS 38.306 V15.8.0, Dec. 2019, pp. 1-60.

3GPP, "3rd Generation Partnership Project; Technical Specification Group Radio Access Network; NR; Radio Resource Control (RRC) protocol specification (Release 15)", 3GPP TS 38.331 V15.9.0, Mar. 2020, pp. 1-536.

* cited by examiner

RESOURCE ATTRIBUTE CONFIGURATION

CROSS-REFERENCE TO RELATED APPLICATIONS

This application claims priority to U.S. patent application Ser. No. 63/004,192 entitled "APPARATUSES, METHODS, AND SYSTEMS FOR RESOURCE CONFIGURATION AND DUPLEXING ENHANCEMENT IN INTEGRATED ACCESS AND BACKHAUL" and filed on Apr. 2, 2020 for Majid Ghanbarinejad, which is incorporated herein by reference in its entirety.

FIELD

The subject matter disclosed herein relates generally to wireless communications and more particularly relates to resource attribute configuration.

BACKGROUND

In certain wireless communications networks, resource attributes may be hard, soft, or unavailable. These resource attributes may correspond to a certain domain, but may be unknown for other domains and/or combinations of domains.

BRIEF SUMMARY

Methods for resource attribute configuration are disclosed. Apparatuses and systems also perform the functions of the methods. One embodiment of a method includes receiving a first configuration for a resource. The first configuration includes a first parameter indicating a time-domain attribute associated with the resource, and the time-domain attribute is hard, soft, and/or unavailable. In some embodiments, the method includes receiving a second configuration for the resource. The second configuration includes a second parameter indicating a frequency-domain attribute associated with the resource, and the frequency-domain attribute is hard, soft, and/or unavailable. In certain embodiments, the method includes determining an attribute for the resource based on the time-domain attribute and the frequency-domain attribute. The attribute is hard, soft, and/or unavailable. In various embodiments, the method includes, in response to determining that the attribute is soft: determining whether the resource is indicated as available; and, in response to determining that the resource is indicated as available, performing an operation on the resource. The operation is a downlink transmission and/or an uplink reception.

One apparatus for resource attribute configuration includes a receiver that: receives a first configuration for a resource, wherein the first configuration includes a first parameter indicating a time-domain attribute associated with the resource, and the time-domain attribute is hard, soft, and/or unavailable; and receives a second configuration for the resource, wherein the second configuration includes a second parameter indicating a frequency-domain attribute associated with the resource, and the frequency-domain attribute is hard, soft, and/or unavailable. In various embodiments, the apparatus includes a processor that: determines an attribute for the resource based on the time-domain attribute and the frequency-domain attribute, wherein the attribute is hard, soft, and/or unavailable; and, in response to determining that the attribute is soft: determines whether the resource is indicated as available; and, in response to determining that the resource is indicated as available, performs an operation on the resource, wherein the operation is a downlink transmission and/or an uplink reception.

Another embodiment of a method for resource attribute configuration includes receiving a configuration for a symbol. The configuration includes a parameter indicating a first attribute associated with the symbol, and the first attribute is hard, soft, and/or unavailable. In some embodiments, the method includes receiving a first control message corresponding to a set of frequencies. In various embodiments, the method includes determining a second attribute for a resource on the symbol based on the first attribute and the first control message. The second attribute is hard, soft, and/or unavailable. In certain embodiments, the method includes, in response to determining that the second attribute is soft: determining whether the resource is indicated as available; and, in response to determining that the resource is indicated as available, performing an operation on the resource. The operation is a downlink transmission and/or an uplink reception.

Another apparatus for resource attribute configuration includes a receiver that: receives a configuration for a symbol, wherein the configuration includes a parameter indicating a first attribute associated with the symbol, and the first attribute is hard, soft, and/or unavailable; and receives a first control message corresponding to a set of frequencies. In various embodiments, the apparatus includes a processor that: determines a second attribute for a resource on the symbol based on the first attribute and the first control message, wherein the second attribute is hard, soft, and/or unavailable; and, in response to determining that the second attribute is soft: determines whether the resource is indicated as available; and, in response to determining that the resource is indicated as available, performs an operation on the resource, wherein the operation is a downlink transmission and/or an uplink reception.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
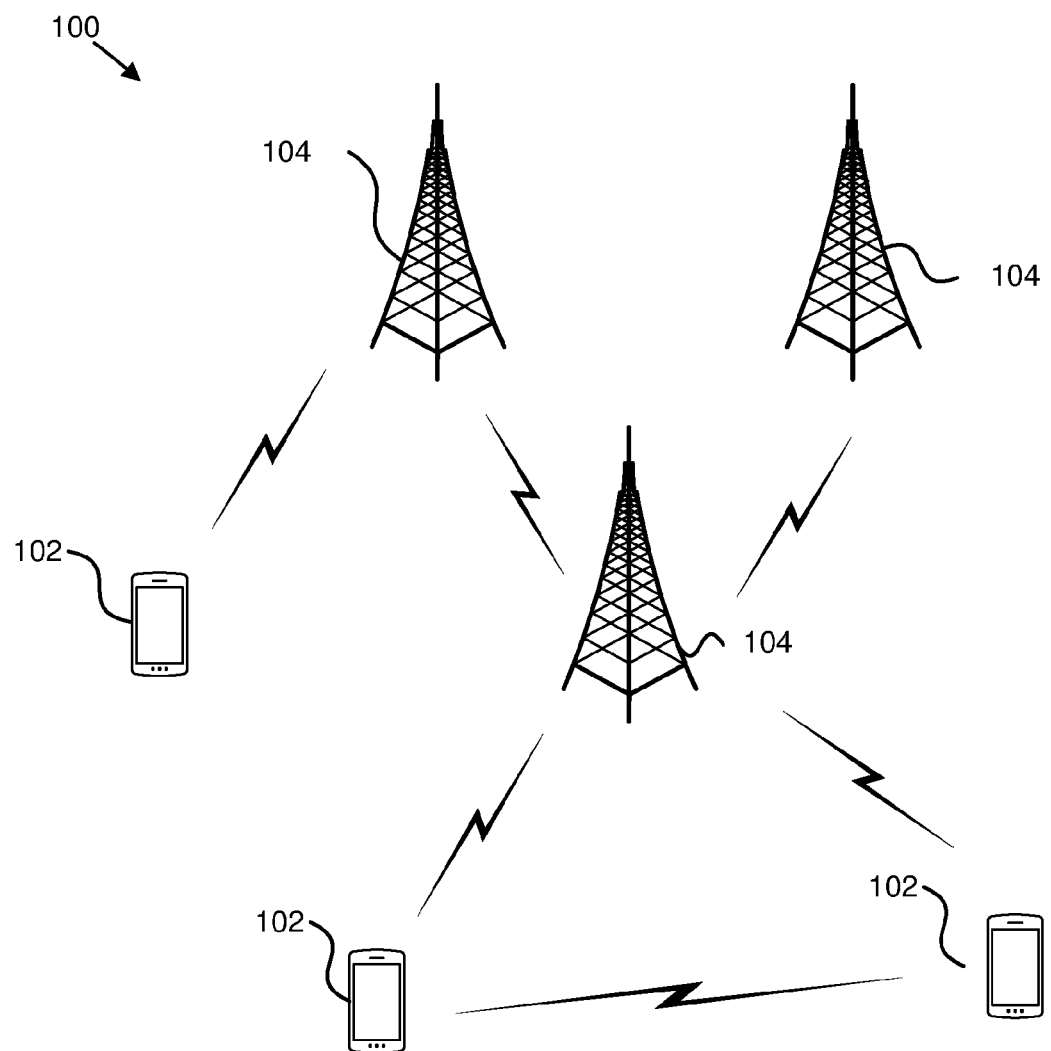
FIG. 1 is a schematic block diagram illustrating one embodiment of a wireless communication system for resource attribute configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for resource attribute configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system to architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a first configuration for a resource. The first configuration includes a first parameter indicating a time-domain attribute associated with the resource, and the time-domain attribute is hard, soft, and/or unavailable. In some embodiments, the remote unit 102 may receive a second configuration for the resource. The second configuration includes a second parameter indicating a frequency-domain attribute associated with the resource, and the frequency-domain attribute is hard, soft, and/or unavailable.

In certain embodiments, the remote unit 102 may determine an attribute for the resource based on the time-domain attribute and the frequency-domain attribute. The attribute is hard, soft, and/or unavailable. In various embodiments, the remote unit 102 may, in response to determining that the attribute is soft: determine whether the resource is indicated as available; and, in response to determining that the resource is indicated as available, perform an operation on the resource. The operation is a downlink transmission and/or an uplink reception. Accordingly, the remote unit 102 may be used for resource attribute configuration.

In certain embodiments, a remote unit 102 may receive a configuration for a symbol. The configuration includes a parameter indicating a first attribute associated with the symbol, and the first attribute is hard, soft, and/or unavailable. In some embodiments, the remote unit 102 may receive a first control message corresponding to a set of frequencies. In various embodiments, the remote unit 102 may determine a second attribute for a resource on the symbol based on the first attribute and the first control message. The second attribute is hard, soft, and/or unavailable. In certain embodiments, the remote unit 102 may, in response to determining that the second attribute is soft: determine whether the resource is indicated as available; and, in response to determining that the resource is indicated as available, perform an operation on the resource. The operation is a downlink transmission and/or an uplink reception. Accordingly, the remote unit 102 may be used for resource attribute configuration.

Figure 2:
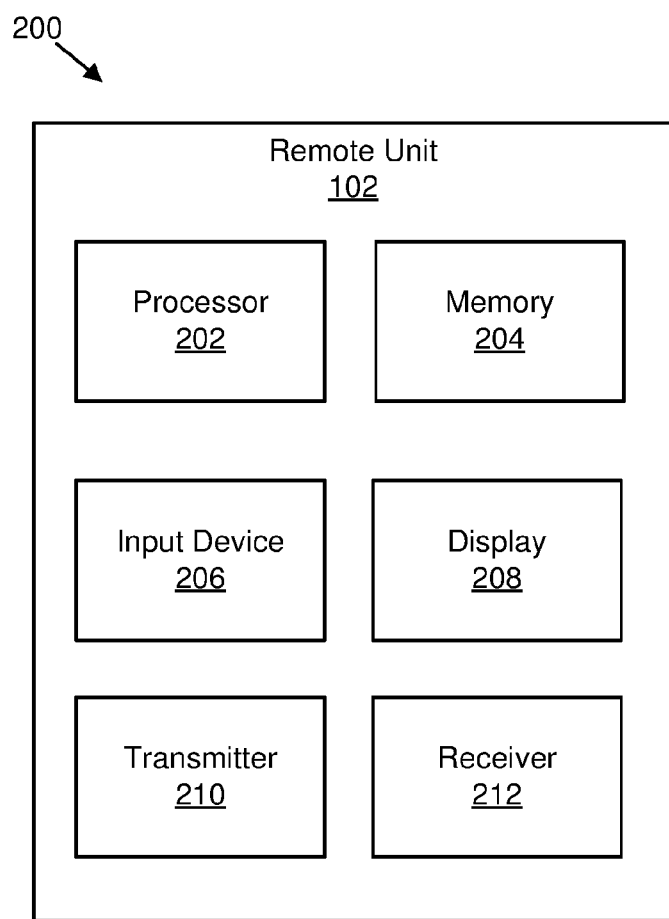
FIG. 2 is a schematic block diagram illustrating one embodiment of an apparatus that may be used for resource attribute configuration.

FIG. 2 depicts one embodiment of an apparatus 200 that may be used for resource attribute configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212: receives a first configuration for a resource, wherein the first configuration includes a first parameter indicating a time-domain attribute associated with the resource, and the time-domain attribute is hard, soft, and/or unavailable; and receives a second configuration for the resource, wherein the second configuration includes a second parameter indicating a frequency-domain attribute associated with the resource, and the frequency-domain attribute is hard, soft, and/or unavailable. In various embodiments, the processor 202: determines an attribute for the resource based on the time-domain attribute and the frequency-domain attribute, wherein the attribute is hard, soft, and/or unavailable; and, in response to determining that the attribute is soft: determines whether the resource is indicated as available; and, in response to determining that the resource is indicated as available, performs an operation on the resource, wherein the operation is a downlink transmission and/or an uplink reception.

In certain embodiments, the receiver 212: receives a configuration for a symbol, wherein the configuration includes a parameter indicating a first attribute associated with the symbol, and the first attribute is hard, soft, and/or unavailable; and receives a first control message corresponding to a set of frequencies. In various embodiments, the processor 202: determines a second attribute for a resource on the symbol based on the first attribute and the first control message, wherein the second attribute is hard, soft, and/or unavailable; and, in response to determining that the second attribute is soft: determines whether the resource is indicated as available; and, in response to determining that the resource is indicated as available, performs an operation on the resource, wherein the operation is a downlink transmission and/or an uplink reception.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
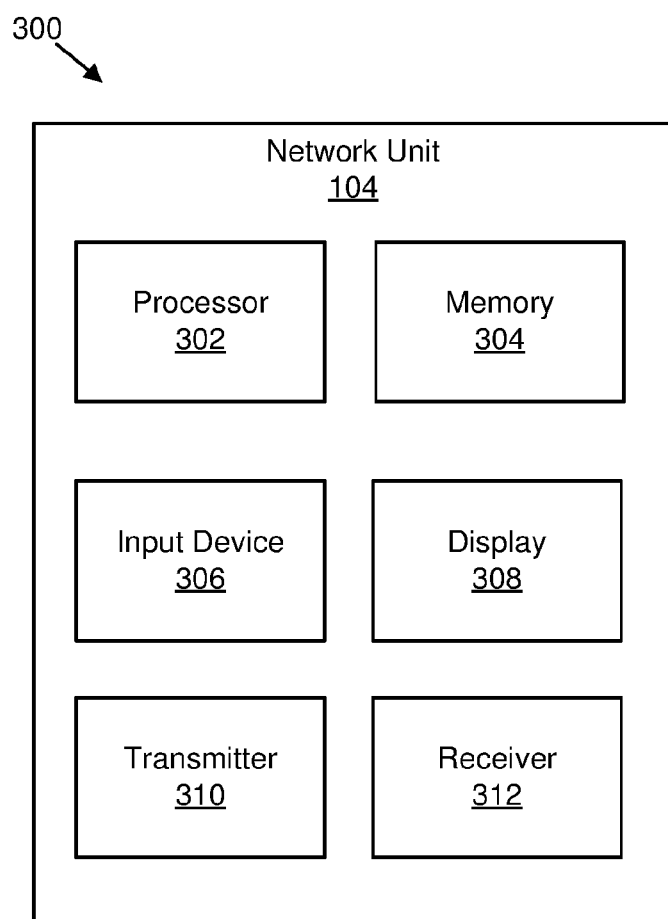
FIG. 3 is a schematic block diagram illustrating one embodiment of an apparatus that may be used for resource attribute configuration.

FIG. 3 depicts one embodiment of an apparatus 300 that may be used for resource attribute configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, integrated access and backhaul ("IAB") technology may be used. In such embodiments, the IAB technology may aim to increase deployment flexibility and reduce 5G rollout costs. Moreover, JAB technology may enable service providers to reduce cell planning and spectrum planning efforts while using the wireless backhaul technology.

In certain embodiments, IAB may relate to a specific multiplexing and duplexing scheme and/or time-division multiplexing ("TDM") between upstream communications (e.g., with a parent IAB node and/or donor) and downstream communications (e.g., with a child JAB node or a UE).

In some embodiments, IAB may operate in a flexible time division duplex ("TDD") mode. In such embodiments, each slot may be configured semi-statically to contain downlink ("DL" and/or "D") symbols, uplink ("UL" and/or "U") symbols, and flexible ("F") symbols. Each flexible symbol may be configured to be a DL symbol or an UL symbol at an instance. The DL, UL, and/or F configurations may follow an UL-F-DL pattern (e.g., they may start with UL symbols and end with DL symbols) thereby providing flexibility over configurations that only follow a DL-F-UL pattern.

In various embodiments, in an JAB system, resources may be configured as hard ("H") or soft ("S"), or if not H or S the resources may be considered not available ("NA"). In such embodiments, hard resources may be always available for scheduling communications with a UE or a child node; soft resources may be possibly available which may be indicated by DCI signaling; and NA symbols may not be available to an JAB node for scheduling its own communications with a UE or a child node (however, this does not mean that the JAB node may not communicate with its parent node using the NA symbols, perform measurements on the NA symbols, and so forth).

In certain embodiments, D, U, F, H, S, and/or NA attributes may be per OFDM symbol (e.g., the granularity for resource configuration with these attributes may be all available frequency resources (e.g., in the active bandwidth part) on time resources as short as one OFDM symbol). In such embodiments, if soft resources are to be indicated available or not available by DCI signaling, the granularity for availability indication ("AI") may be a resource type in terms of D, U, and/or F per slot. That is, all symbols that are configured D, L, or F in a slot are indicated available or not available. This may indicate a coarser granularity (e.g., essentially all frequency resources on one or several OFDM symbols).

In some embodiments, there may be support for simultaneous operation (e.g., transmission and/or reception of signals) in an JAB system by enhancing resource multiplexing between child and parent nodes. In various embodiments, resource configuration and availability indication may only be enabled in the time domain. In certain embodiments, resource configuration and availability indication may be enabled in the frequency domain. In some embodiments, since there are a large number of physical resource blocks ("PRBs") in a frequency domain (e.g., compared to the number of OFDM symbols in a slot), it may not be sufficient to replicate time-domain provisions for the frequency domain.

Figure 4:
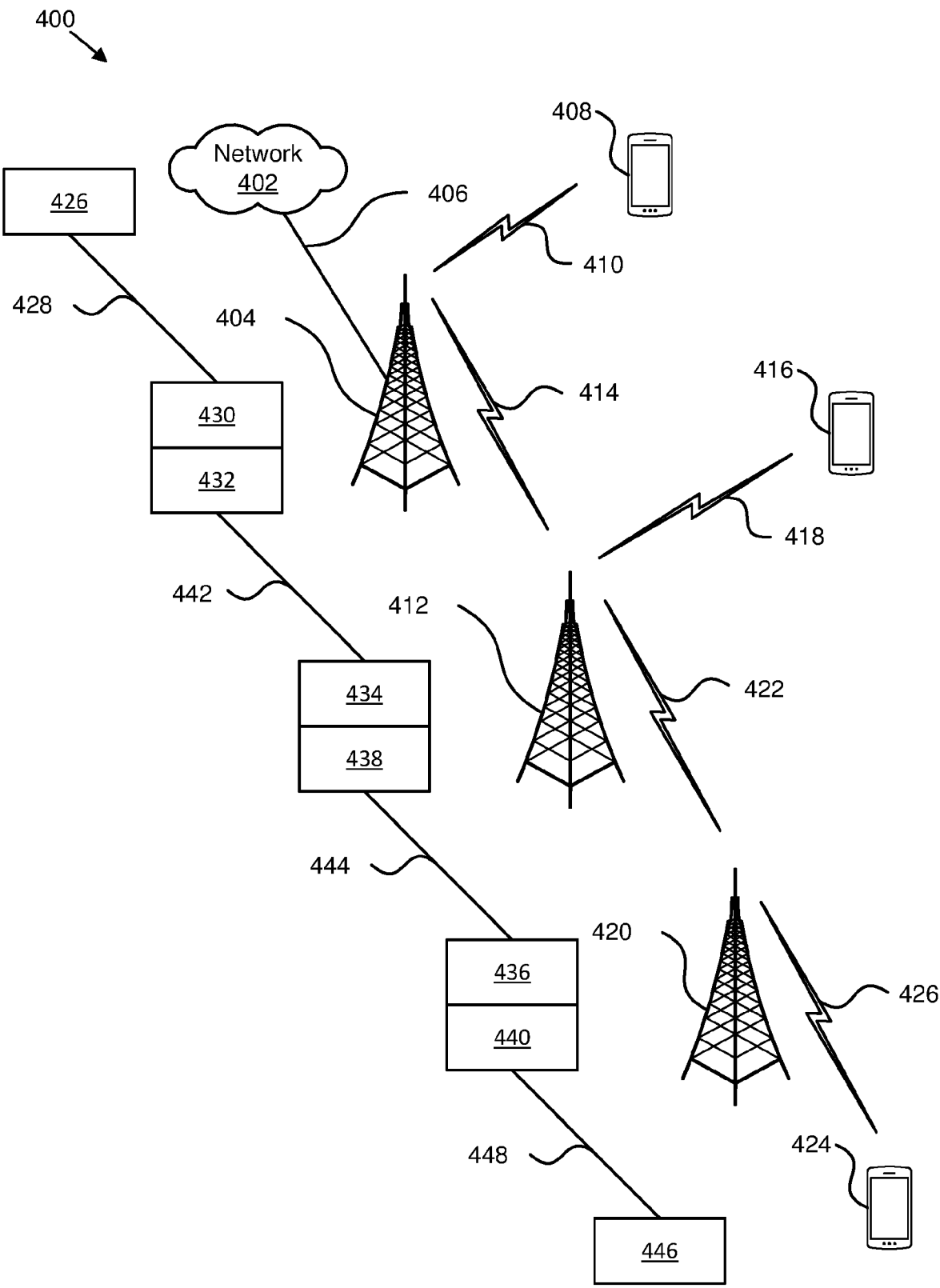
FIG. 4 is a diagram illustrating one embodiment of an IAB system.

FIG. 4 is a diagram illustrating one embodiment of an JAB system 400. The JAB system 400 includes a network 402 (e.g., core network) that communicates with an IAB donor 404 via a first communication link 406. Moreover, the JAB system 400 also includes a first UE 408 that communicates with the IAB donor 404 via a second communication link 410. Further, the JAB system 400 includes a first JAB node 412 that communicates with the IAB donor 404 via a third communication link 414. The JAB system 400 also includes a second UE 416 that communicates with the first JAB node 412 via a fourth communication link 418. Moreover, the JAB system 400 includes a second JAB node 420 that communicates with the first JAB node 412 via a fifth communication link 422. Further, the IAB system 400 includes a third UE 424 that communicates with the second IAB node 420 via a sixth communication link 426.

As illustrated in further detail, a network 426 is connected to the IAB donor 404 through a backhaul link 428, which may be wired. The IAB donor 404 includes a CU (IAB-CU) 430 and a DU (IAB-DU) 432. The IAB donor 404 communicates with all the DUs in the system through an F1 interface. Each IAB node (e.g., 412 and 420) is functionally split into at least an MT (IAB-MT) (e.g., 434, 436) and a DU (IAB-DU) (e.g., 438, 440). An MT of an IAB node is connected to a DU of a parent node, which may be another IAB node or the IAB donor 404.

A wireless connection (e.g., 414, 422, 426, 442, 444) between an MT of an IAB node and a DU of a parent node, which may be a Uu link, is called a wireless backhaul link. In the wireless backhaul link, in terms of functionalities, the MT is similar to a UE and the DU of the parent node is similar to a base station in a conventional cellular wireless link. Therefore, a link from an MT to a serving cell that is a DU of a parent link is called an uplink, and a link in the reverse direction is called a downlink. In this disclosure, embodiments may simply refer to an is uplink or a downlink between IAB nodes, a link between a node and its parent, a link between a node and its child, and so forth without a direct reference to an MT, DU, serving cell, and so forth.

Each IAB donor or IAB node may serve UEs (e.g., 446) through access links (e.g., 448). IAB systems like IAB system 400 may be designed to enable multi-hop communications (e.g., a UE may be connected to the core network through an access link and multiple backhaul links between IAB nodes and an IAB donor). As used herein, unless stated otherwise, an "IAB node" may generally refer to an IAB node or an IAB donor as long as a connection between a CU and a core network is not concerned.

A node, link, etc. closer to an IAB donor and/or core network may be called an upstream node, link, etc. For example, a parent node of a subject node is an upstream node of the subject node and the link to the parent node is an upstream link with respect to the subject node. Similarly, a node, link, etc. farther from the IAB donor and/or core network is called a downstream node, link, etc. For example, a child node of a subject node is a downstream node of the subject node and the link to the child node is a downstream link with respect to the subject node.

Table 1 summarizes terminology used herein.

TABLE 1

Terminology

| Phrase | Description |
| --- | --- |
| Wireless backhaul link | A connection between an MT of an IAB node and a DU of a serving cell |
| Wireless access link | A connection between a UE and (a DU of) a serving cell |
| IAB-node | RAN node that supports NR access links to UEs and NR backhaul links to parent nodes and child nodes. |
| IAB-MT | IAB-node function that terminates the Uu interface to the parent node |
| IAB-DU | gNB-DU functionality supported by the IAB-node to terminate the NR access interface to UEs and next-hop IAB-nodes, and to terminate the F1 protocol to the gNB-CU functionality on the IAB-donor |
| IAB-donor | gNB that provides network access to UEs via a network of backhaul and access links. |
| Parent [IAB] node | An IAB node or IAB donor that comprises a serving cell of the subject node. In some examples, IAB-node-MT's next hop neighbour node; the parent node can be IAB-node or IAB-donor-DU. |
| Child [IAB] node | An IAB node that identifies the subject node as a serving cell. In some examples, IAB-node-DU's next hop neighbour node; the child node is also an IAB-node. |
| Sibling [IAB] node | An IAB node that has a common parent with the subject node |
| Uplink (of a wireless backhaul link) | A link from an MT to a DU of a parent node |
| Downlink (of a wireless backhaul link) | A link from a DU to an MT of a child node |
| Upstream node/link/etc. | A node, link, etc. (topologically) closer to the IAB donor and/or core network. Direction toward parent node in IAB-topology |
| Downstream node/link/etc. | A node, link, etc. (topologically) farther from the IAB donor and/or core network. Direction toward child node or UE in IAB-topology |

As used herein, an "operation" or a "communication," may refer to a transmission or a reception in an uplink (e.g., upstream) or a downlink (e.g., downstream). Moreover, the terms "simultaneous operation" or "simultaneous communications" may refer to multiplexing and/or duplexing transmissions and/or receptions by a node through one or more antennas and/or panels. Details of the simultaneous operation (or concurrent operation) may be understood from context.

In various embodiments, dynamic TDD may be used (e.g., in NR) through RRC configurations and lower layer control signaling. Dynamic TDD may enable NR systems to have more flexible slot formats for TDD operation that may be modified dynamically for adaptation to varying traffic. RRC signaling may configure slots for TDD operation using various IEs described herein.

TDD-UL-DL-ConfigCommon IE: this information element ("IE") may determine a cell-specific uplink and/or downlink TDD configuration. The IE may contain a periodicity value between 0.5 ms and 10 ms and a reference subcarrier spacing ("SCS"). A slot configuration pattern (through one or two pattern fields) may be defined within the periodicity. The periodicity may contain multiple slots. The most general pattern for each periodicity may be a number of downlink slots and symbols at the beginning and a number of uplink symbols and slots at the end. All remaining slots and/or symbols in between may be flexible and may be overridden by a following UE-specific configuration.

TDD-UL-DL-ConfigDedicated IE: this IE may determine a UE-specific uplink and/or downlink TDD configuration. The IE may configure a number of slot configurations. Each slot configuration may contain an index based on a periodicity defined by a cell-specific configuration, and a number of downlink and uplink symbols in the slot, which may override flexible symbols configured by the cell-specific configuration.

In certain embodiments, resources that are flexible (e.g., not configured downlink or uplink) by a cell-specific or UE-specific configuration may be dynamically indicated as downlink or uplink by a DCI format 2_0 for a UE or a group of UEs. Corresponding DCI may contain slot format indicators ("SFIs") and an index to a table of slot formats may be configured by RRC signaling. The configuration from RRC signaling may refer to each slot format by an 8-bit number.

In some embodiments, 56 of 256 possible values (e.g., indexed 0-55) may be used to define slot formats of various combinations. The general format for each of slot formats may be DL-F-UL, where a slot format may contain one, two, or all of the three types of the symbols with various numbers in the specified order. In such embodiments, 41 more values (e.g., indexed 56-96) may be used for UL-F-DL formats for IAB to provide further flexibility for an IAB node that may start a slot with uplink symbols followed by downlink symbols.

In various embodiments, resources that are not configured or indicated as downlink or uplink by any signaling may be assumed to be reserved which may enable flexibility for cell management, coexistence, and so forth.

In certain embodiments, time-domain allocation parameters k0, k1, k2 (e.g., in NR) may be used herein and may defined.

PDSCH time-domain allocation: the RRC parameter k0 in RRC information element PDSCH-TimeDomainResourceAllocation may indicate an offset between a slot that contains a DCI that schedules a PDSCH transmission and a slot that contains the PDSCH transmission.

PDSCH hybrid automatic repeat request ("HARQ") feedback timing: the L1 parameter k1 may be provided by the 'PDSCH-to-HARQ_feedback timing indicator' field in DCI formats 1_0 and 1_1 (e.g., for scheduling a PDSCH transmission).

Physical uplink shared channel ("PUSCH") time-domain allocation: the RRC parameter k2 in the RRC information element PUSCH-TimeDomainResourceAllocation may to indicate an offset between a slot that contains a DCI that schedules a PUSCH transmission and a slot that contains the PUSCH transmission.

In some embodiments, such as in NR systems, control and shared channels may be communicated on bandwidth parts configured by RRC and further by MAC and layer-1.

In certain embodiments, a UE may be configured with bandwidth parts ("BWPs") for downlink and/or uplink.

For downlink, a UE may be configured with a set of at most four BWPs for reception by the UE (e.g., DL BWP set) in a DL bandwidth by parameter BWP-Downlink or by parameter initialDownlinkBWP with a set of parameters configured by BWP-DownlinkCommon and BWP-DownlinkDedicated. If a UE is not provided with initialDownlinkBWP, an initial DL BWP may be defined by a location and a number of contiguous PRBs, starting from a PRB with the lowest index and ending at a PRB with the highest index among PRBs of a control resource set ("CORESET") for Type0-PDCCH common search space ("CSS") set, and a SCS and a cyclic prefix for physical downlink control channel ("PDCCH") reception in the CORESET for Type0-PDCCH CSS set; otherwise, the initial DL BWP may be provided by initialDownlinkBWP.

For uplink, a UE can be configured a set of at most four BWPs for transmission by the UE (e.g., UL BWP set) in an UL bandwidth by parameter BWP-Uplink or by parameter initialUplinkBWP with a set of parameters configured by BWP-UplinkCommon and BWP-UplinkDedicated. For operation on a primary cell or on a secondary cell, a UE may be provided an initial UL BWP by initialUplinkBWP. If the UE is configured with a supplementary UL carrier, the UE may be provided an initial UL BWP on a supplementary UL carrier by initialUplinkBWP.

In some embodiments, if a UE has a dedicated BWP configuration, the UE may be provided by firstActiveDownlinkBWP-Id a first active DL BWP for receptions and by firstActiveUplinkBWP-Id a first active UL BWP for transmissions on a carrier of a primary cell.

In various embodiments, for each DL BWP or UL BWP in a set of DL BWPs or UL BWPs, respectively, a UE may be provided the following parameters for a serving cell: SCS, cyclic prefix ("CP") length (normal or extended), a start RB and a number of contiguous RBs, an index in the set of DL BWPs or UL BWPs (e.g., by a respective BWP-Id), and a set of BWP-common and a set of BWP-dedicated parameters.

In certain embodiments, a BWP switching for a serving cell may be used to activate an inactive BWP and deactivate an active BWP at a time. The BWP switching may be controlled by a PDCCH transmission indicating a downlink assignment or an uplink grant, by the bwp-InactivityTimer, by RRC signaling, or by a MAC entity itself upon initiation of a random access procedure. Upon RRC configuration and/or reconfiguration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively may be active without receiving a PDCCH transmission indicating a downlink assignment or an uplink grant. The active BWP for a serving cell may be indicated by either RRC signaling or a PDCCH transmission. For an unpaired spectrum, a DL BWP may be paired with a UL BWP, and BWP switching may be common for both UL and DL.

In some embodiments, a bandwidth part indicator field may be configured in DCI format 0_1 or DCI format 1_1 for indicating an active UL BWP or an active DL BWP from a configured set. In such embodiments, a UE may set the active UL BWP or DL BWP to the indicated UL BWP or DL BWP.

Figure 5:
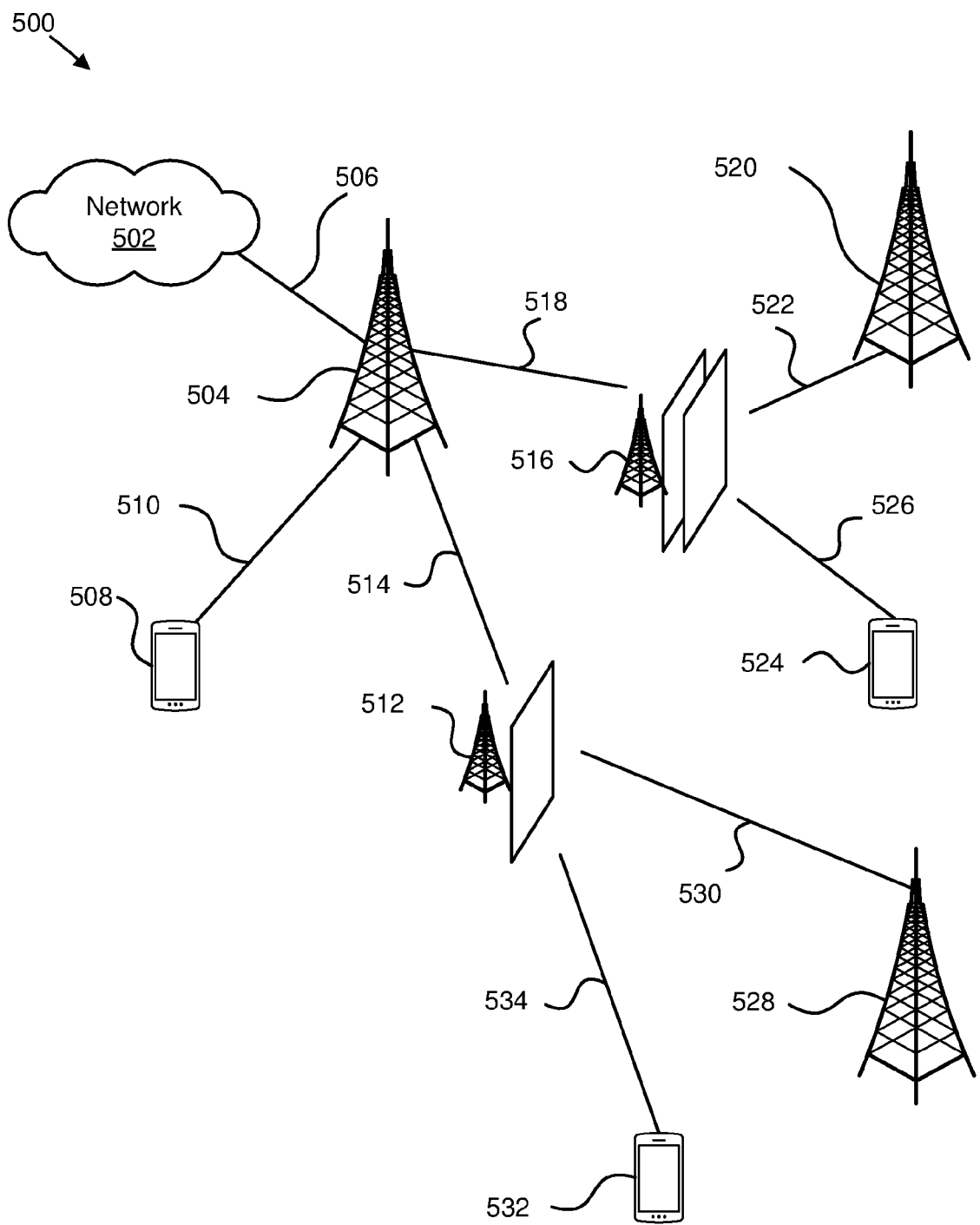
FIG. 5 is a diagram illustrating one embodiment of an IAB system with single-panel and multi-panel IAB nodes.

FIG. 5 illustrates an IAB system (e.g., an IAB network). An IAB system or an IAB network may be connected to a core network through one or more IAB donors. Each JAB node may be connected to an IAB donor and/or other IAB nodes through wireless backhaul links. Each IAB donor and/or node may also serve UEs.

FIG. 5 is a diagram illustrating another embodiment of an JAB system 500. The JAB system 500 includes an JAB network 502 and an IAB donor 504 (e.g., parent JAB node)

connected by a first backhaul link 506. The JAB system 500 includes a first UE 508 connected to the IAB donor 504 by a second backhaul link 510. Moreover, the JAB system 500 includes a first JAB node 512 (e.g., single-panel node) connected to the IAB donor 504 by a third backhaul link 514. Furthermore, the JAB system 500 includes a second JAB node 516 (e.g., multi-panel node) connected, through a first antenna panel of the JAB node 516, to the IAB donor 504 by a fourth backhaul link 518. The JAB system 500 includes a third JAB node 520 (e.g., child JAB node) connected to the second JAB node 516, through a second antenna panel of the JAB node 516, by a fifth backhaul link 522. Moreover, the JAB system 500 includes a second UE 524 connected to the second JAB node 516, through the first antenna panel or the second antenna panel of the JAB node 516, by a sixth backhaul link 526. Furthermore, the JAB system 500 includes a fourth JAB node 528 (e.g., child JAB node) connected to the first JAB node 512 by a seventh backhaul link 530. The JAB system 500 includes a third UE 532 connected to the first JAB node 512 by an eighth backhaul link 534.

Figure 6:
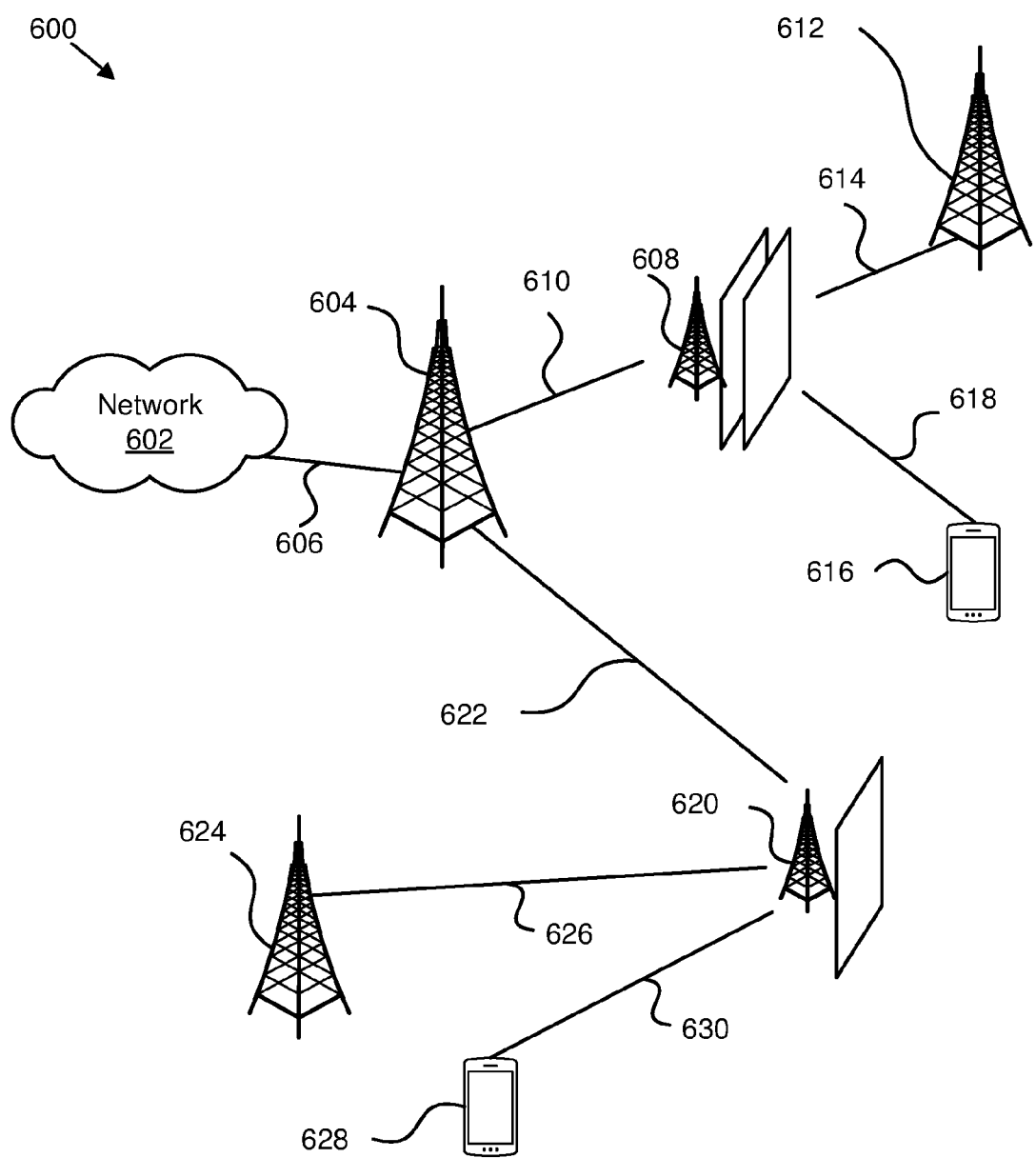
FIG. 6 is a diagram illustrating another embodiment of an IAB system with single-panel and multi-panel IAB nodes.

FIG. 6 is a diagram illustrating another embodiment of an JAB system 600 with single-panel and multi-panel JAB nodes. The JAB system 600 includes a network 602 and an IAB donor 604 (e.g., parent JAB node) connected by a first backhaul link 606. The JAB system 600 includes a first JAB node 608 (e.g., multi-panel node) connected, through a first antenna panel of the JAB node 608, to the IAB donor 604 by a second backhaul link 610. The JAB system 600 includes a second JAB node 612 (e.g., child JAB node) connected to the second JAB node 608, through a second antenna panel of the JAB node 608, by a third backhaul link 614. Moreover, the JAB system 600 includes a first UE 616 connected to the first JAB node 608, through the second antenna panel of the JAB node 608, by a fourth backhaul link 618. Furthermore, the JAB system 600 includes a third JAB node 620 (e.g., single-panel node) connected to the IAB donor 604 by a fifth backhaul link 622. Furthermore, the JAB system 600 includes a fourth JAB node 624 (e.g., child JAB node) connected to the third JAB node 620 by a sixth backhaul link 626. The JAB system 600 includes a second UE 628 connected to the third JAB node 620 by a seventh backhaul link 630.

In some embodiments, there may be various options with regards to a structure and multiplexing and/or duplexing capabilities of an JAB node. For example, each JAB node may have one or more antenna panels, array, and/or sub-arrays. Each of the one or more antenna panels, array, and/or sub-arrays may be connected to a baseband unit through one or more RF chains One or more antenna panels may be able to serve a whole spatial area of interest in a vicinity of an JAB node, or each antenna panel or each group of antenna panels may provide a partial coverage (e.g., in a sector). An JAB node with multiple antenna panels, each serving a separate spatial area or sector, may be referred to as a single-panel JAB node as it behaves similarly to a single-panel JAB node for communications in each of the separate spatial areas or sectors.

In various embodiments, each antenna panel may be half-duplex ("HD") (e.g., able to either transmit or receive signals in a frequency band at a time), or full-duplex ("FD") (e.g., able to both transmit and receive signals in a frequency band simultaneously). Unlike full-duplex radio, half-duplex radio may be implemented and used in practice and may be assumed as a default mode of operation in a wireless systems.

Table 2 lists different duplexing scenarios that may be used if multiplexing is not constrained to time-division multiplexing ("TDM"). In Table 2, JAB node 1 ("N1") is a single-panel JAB node; JAB node 2 ("N2") is a multi-panel JAB node; spatial-division multiplexing ("SDM") refers to either transmission or reception on downlink (or downstream) and uplink (or upstream) simultaneously; full duplex ("FD") refers to simultaneous transmission and reception by the same antenna panel in a frequency band; and multi-panel transmission and reception ("MPTR") refers to simultaneous transmission and reception by multiple antenna panels where each antenna panel either transmits or receives in a frequency band at a time.

TABLE 2

| Scenario | IAB-MT | IAB-DU | Type |
|---|---|---|---|
| S1 (Case B) | N1-DL-RX | N1-UL-RX | SDM |
| S2 (Case D) | N1-DL-RX | N1-DL-TX | FD |
| S3 (Case A) | N1-UL-TX | N1-DL-TX | SDM |
| S4 (Case C) | N1-UL-TX | N1-UL-RX | FD |
| S5 (Case B) | N2-DL-RX | N2-UL-RX | SDM |
| S6 (Case D) | N2-DL-RX | N2-DL-TX | MPTR/FD |
| S7 (Case A) | N2-UL-TX | N2-DL-TX | SDM |
| S8 (Case C) | N2-UL-TX | N2-UL-RX | MPTR/FD |

In one example, consider scenario S6 in which a multi-panel JAB node N2 receives a downlink control information ("DCI") message (e.g., called DCI1) on a control channel scheduling a physical downlink shared channel ("PDSCH") transmission (e.g., called PDSCH1), from a parent node to N2. Suppose N2 intends to schedule another downlink channel, called PDSCH2, from N2 to a child node or a user equipment. Since N2 has multiple panels, the two PDSCHs may be scheduled simultaneously, in addition to full duplex ("FD"), through a multi-panel transmission and/or reception ("MPTR") and/or frequency-division multiplexing ("FDM") scheme. However, since panel and/or beam selection in N1 for receiving PDSCH1 depends on the transmission configuration indication ("TCI") in DCI1, N2 may receive DCI1 sufficiently in advance to produce and transmit a DCI message (e.g., called DCI2) which schedules PDSCH2. If this condition is not satisfied, PDSCH2 may not be scheduled in a timely manner, which may result in inefficient utilization of the hardware.

Figure 7:
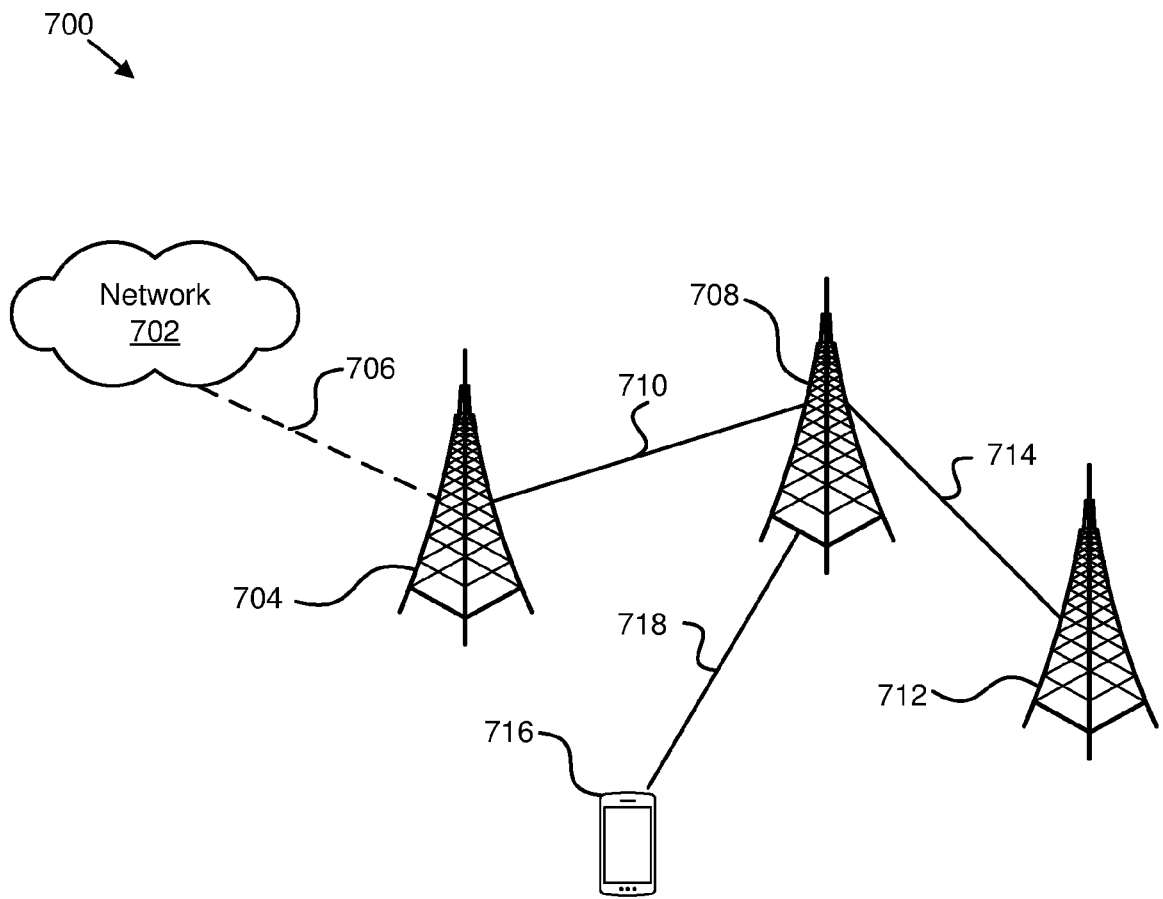
FIG. 7 is a diagram illustrating another embodiment of an IAB system.

FIG. 7 is a diagram illustrating another embodiment of an JAB system 700. The JAB system 700 includes a network 702 and a parent node 704 (e.g., PN) connected by a first backhaul link 706. The JAB system 700 includes an JAB node 708 (e.g., N) connected to the parent node 704 by a second backhaul link 710. The JAB system 700 includes a child JAB node 712 (e.g., CN) connected to the JAB node 708 by a third backhaul link 714. Moreover, the JAB system 700 includes a UE 716 connected to the JAB node 708 by a fourth backhaul link 718. Each of the parent node 704, the JAB node 708, and the child node 712 may be single-panel or multi-panel as described herein.

In various embodiments, an JAB system may determine whether resource are available (e.g., either configured hard, soft, or indicated available). In such embodiments, a granularity of availability of resources may be a symbol at all frequencies (e.g., within an active BWP). Even if a resource is not configured hard because it has periodic signals configured on it, a whole symbol may be considered hard.

In some embodiments, either all frequency resources on a symbol are available or none are available. This may be an issue in various embodiments in which enhanced duplexing allows FDM between communications (e.g., including communications in downstream and upstream).

In certain embodiments, to determine availability of resources for duplexing, the following may be used: 1) explicit methods: this may use new signaling to configure and/or indicate availability of resources in a frequency domain; and 2) implicit methods: rules may be defined that allow an JAB node to determine availability of frequency resources.

In various embodiments, one way to realize FDM between upstream and downstream operations is to configure resources for each node explicitly. For example, resources may be configured in the frequency domain per slot for a period of multiple slots as shown in FIG. 8.

Figure 8:
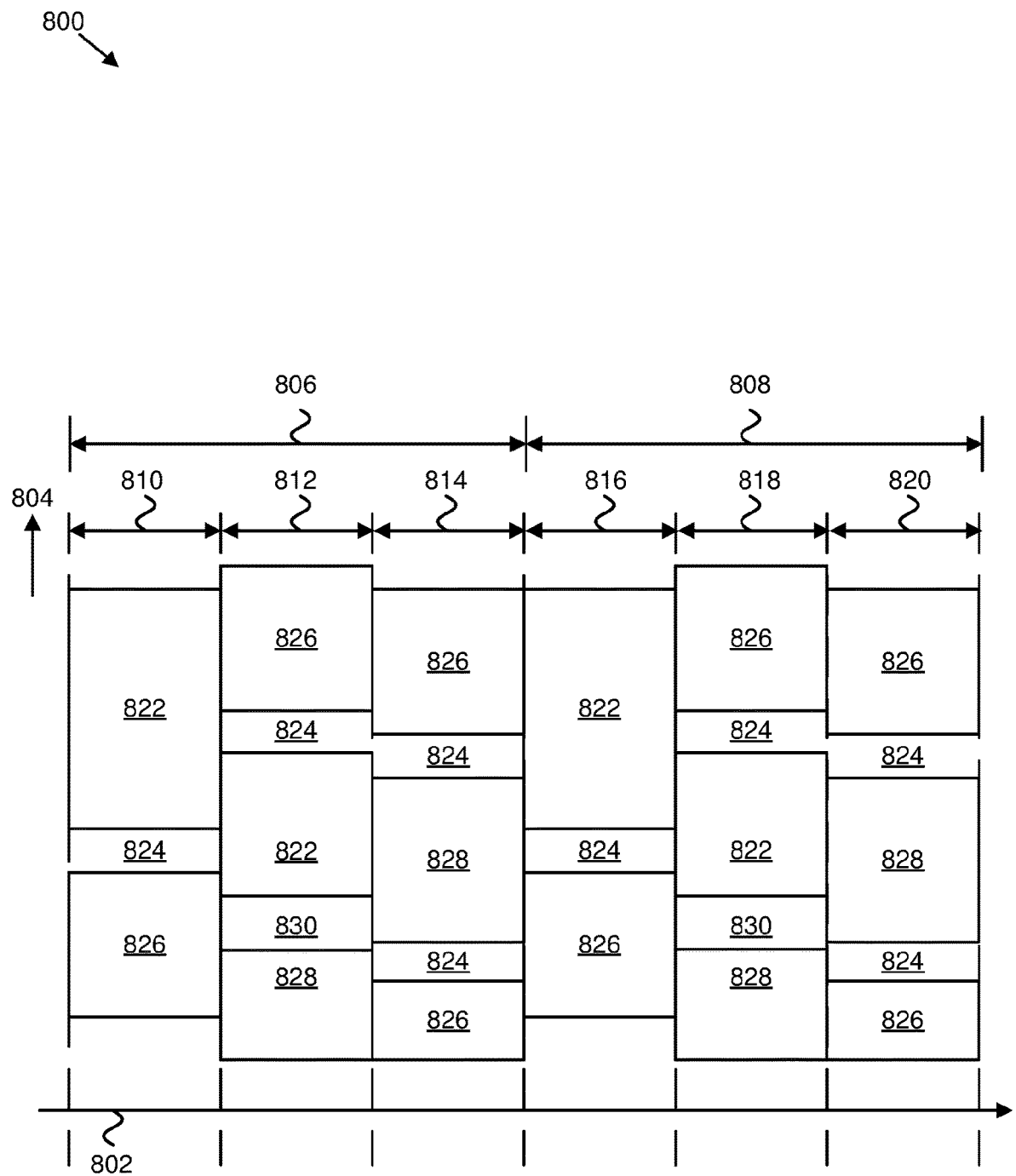
FIG. 8 is a timing diagram illustrating one embodiment of resource configuration in a frequency domain.

FIG. 8 is a timing diagram 800 illustrating one embodiment of resource configuration over a time domain 802 and a frequency domain 804. The time 802 includes a first period 806 and a second period 808 (e.g., the second period 808 is a repetition of the first period 806). The first period 806 includes a first slot 810, a second slot 812, and a third slot 814. Moreover, the second period 808 includes a first slot 816, a second slot 818, and a third slot 820. FIG. 8 illustrates PN transmission frequencies 822 in slots, guard bands 824 that occur between N transmission frequencies and either PN transmission frequencies or CN transmission frequencies, N transmission frequencies 826 in slots, CN transmission frequencies 828 in slots, and overlap frequencies 830.

In FIG. 8, each resource set is configured for a node and labeled accordingly. The configuration is repeated in each period until released or modified. The following can be considered for the semi-static configurations: 1) a node can only use the resources that are configured available for it for scheduling downstream communications to and/or from a child node or a UE—scheduling upstream communications may be left to a parent node; 2) the granularity in the time domain may be slots, symbols, and so forth—the granularity in the frequency domain may be physical resource blocks ("PRBs"), RBGs, physical resource groups ("PRGs"), and so forth—the granularity values may be determined by specification or configured by the system; 3) resource configurations may be sent by a IAB donor CU and may be produced based on information such as the IAB system topology, link qualities (e.g., CSI), traffic intensity on each node, QoS of the traffic on each node, cross-link interference ("CLI"), and so forth; 4) resource configurations for adjacent IAB nodes or next hop neighbor nodes (e.g., a node N and its parent node PN) may depend on the nodes' multiplexing capabilities—for example: a) if N is only capable of TDM, resource sets configured for N and PN may only be configured on separate time resources such as separate slots, b) if N is capable of FDM through a single half-duplex ("HD") antenna and/or panel, non-overlapping resources may be configured for N and PN on the same time resources—such as the same slot, c) if N has multiple half-duplex ("HD") antennas and/or panels, overlapping resources may be configured for N and PN on the same time resources—such as the same slot, and d) if N has a full-duplex ("FD") antenna and/or panel, overlapping resources may be configured for N and PN on the same time resources such as the same slot; 5) resource configurations for N and PN may depend on other node capabilities—for example, if N requires a guard band or a guard time between upstream and downstream operations, that can be considered in the configurations for N and PN—a guard band may be considered between resources configured for N and resources configured for PN or CN—the guard band (e.g., in multiple PRBs for a reference subcarrier spacing) or a guard time (e.g., in terms of OFDM symbols and/or slots for a reference subcarrier spacing) required may depend on a node's capability and may be selected from a set of guard band or guard time possible values and/or may be dependent of the frequency band—the node may indicate its capability information to its PN or CU; and/or 6) overlapping resources may be configured for non-adjacent nodes (e.g., such as PN and CN in the second slot 812 and the second slot 818) unless a cross-link interference ("CLI") is too high.

Tables 3 and 4 illustrate methods for CU and DU in an IAB system.

TABLE 3

| Method for CU |
| --- |
| Receive or configure information for topology, route, channel state ("CSI"), traffic intensity, cross-link interference ("CLI"), multi-panel capability ("MP"), minimum guard time (Tmin), and/or minimum guard band ("Fmin").<br>Send semi-static resource configurations C, each including:<br>a time period (T) and<br>a resource set (R) in the frequency domain in a slot, wherein each resource in the resource set is configured as D, U, or F.<br>such that:<br>a size of the resource set and a location of the resource set in the time-frequency grid are determined based on channel state, traffic intensity, and/or cross-link interference; and<br>guard times and guard bands between resource sets are determined based on information of topology (e.g., what node is what other node's parent node), multi-panel capability, minimum guard time, and/or minimum guard band. |

TABLE 4

| Method for DU |
| --- |
| Receive semi-static resource configurations C, each including:<br>a time period (T) and<br>a resource set (R) in the frequency domain in a slot, wherein each resource in the resource set is configured as D, U, or F.<br>Receive indication of which flexible resources are downlink or uplink. |

TABLE 4-continued

Method for DU

Use resources in the resource sets for scheduling downlink and/or uplink channels for
communications with child nodes ("CNs") and/or UEs such that:
Downlink resources and downlink-indicated flexible resources are used for scheduling
downlink channels.
Uplink resources and uplink-indicated flexible resources are used for scheduling
uplink channels.
Transmit downlink signals on downlink channels and/or receive uplink signals on uplink
channels.

Figure 9:
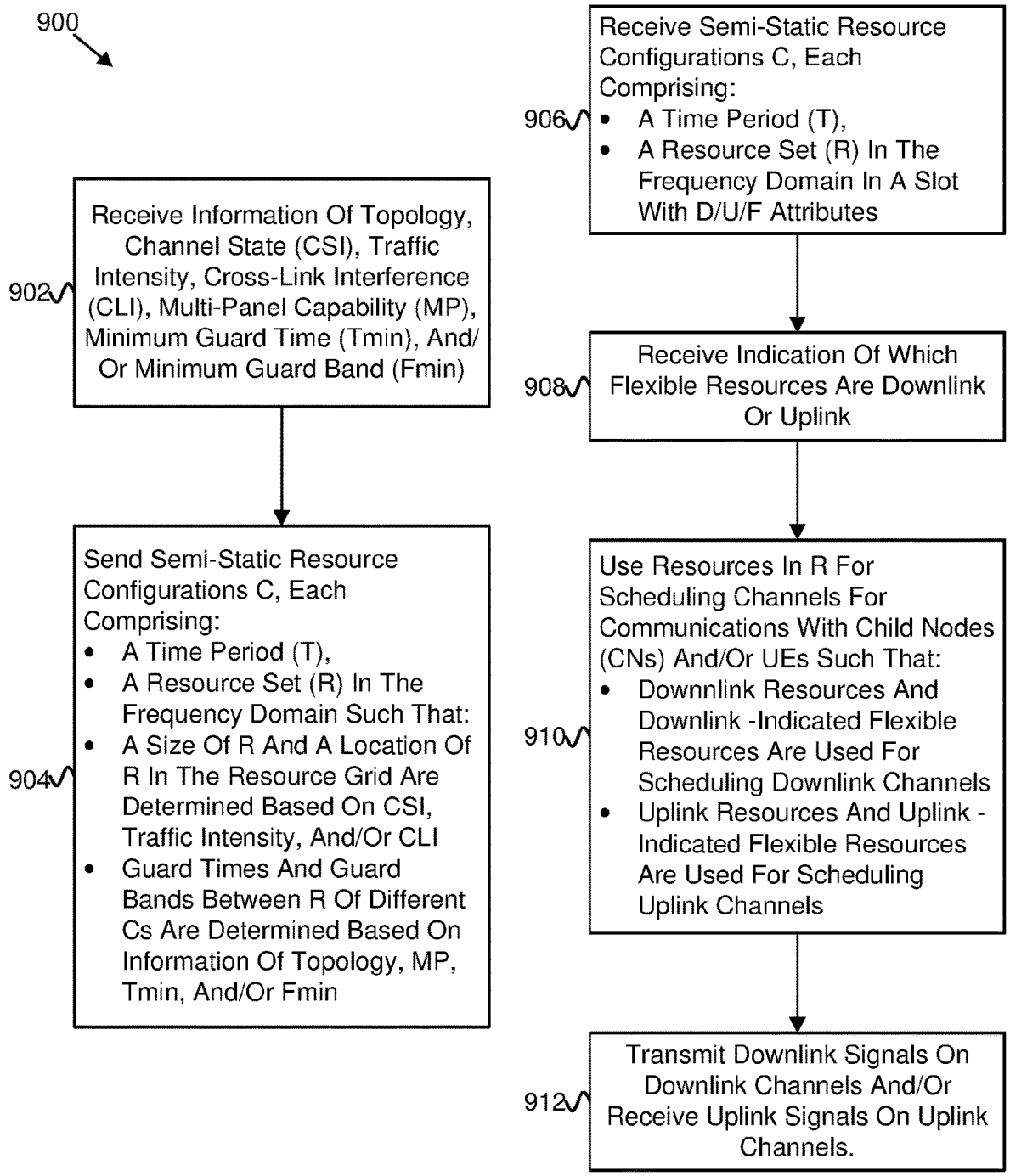
FIG. 9 is a flow chart diagram illustrating one embodiment of a semi-static availability configuration.

FIG. 9 is a flow chart diagram 900 illustrating one embodiment of a semi-static availability configuration. The flow chart diagram 900 includes a method for a CU including: receiving 902 or configuring information for topology, route, channel state ("CSI"), traffic intensity, cross-link interference ("CLI"), multi-panel capability ("MP"), minimum guard time (Tmin), and/or minimum guard band ("Fmin"); and sending 904 semi-static resource configurations C, each including: a time period (T) and a resource set (R) in the frequency domain in a slot, wherein each resource in the resource set is configured as D, U, F, such that: a size of the resource set and a location of the resource set in the time-frequency grid are determined based on channel state, traffic intensity, and/or cross-link interference; and guard times and guard bands between resource sets are determined based on information of topology (e.g., what node is what other node's parent node), multi-panel capability, minimum guard time, and/or minimum guard band.

The flow chart diagram 900 also includes a method for DU including: receiving 906 semi-static resource configurations C, each including: a time period (T) and a resource set (R) in the frequency domain in a slot, wherein each resource in the resource set is configured as D, U, or F; receiving 908 indication of which flexible resources are downlink or uplink; using 910 resources in the resource sets for scheduling downlink and/or uplink channels for communications with child nodes ("CNs") and/or UEs such that: downlink resources and downlink-indicated flexible resources are used for scheduling downlink channels and uplink resources and uplink-indicated flexible resources are used for scheduling uplink channels; and transmitting 912 downlink signals on downlink channels and/or receive uplink signals on uplink channels.

The methods of FIG. 9 may enable FDM between signals in the downstream and upstream through one or more antennas and/or panels. Once an IAB node receives a resource configuration, the IAB node considers the associated resources available for scheduling by the IAB node. Therefore, for an IAB node DU, a resource is either available or not available until configurations are released or modified. This semi-static configuration may not allow a dynamic management of resources, especially in large bandwidths.

In some embodiments, to improve the flexibility of resource configurations in the frequency domain, resources available to a node may be configured as H or S as follows: 1) a hard resource can always be assumed available for a node to schedule communications; and 2) a soft resource cannot be assumed available for the node until it is indicated available by further signaling.

In various embodiments, once a frequency resource is configured as soft, availability of the resource in each period may be determined by further signaling. For example, control signaling such as a DCI message may be used to determine which resources are available at time and frequency domains.

Certain embodiments may be used to indicate how to apply multi-panel, guard time, and guard band constraints if indicating availability of soft resources.

In some embodiments, a node receives information regarding constraints either directly from a child node or from a CU and applies the constraints if indicating availability and scheduling communications. One embodiment of a DU method is found in Table 5.

TABLE 5

Method for DU

Receive semi-static resource configurations C, each including:
a time period (T) and
a resource set (R) in the frequency domain in a slot, wherein each resource in the
resource set is configured as D, U, or F, and also configured as H or S.
Receive information of MP and/or Fmin of CNs.
Receive an indication of which flexible resources are downlink or uplink.
Receive a first frequency-domain availability indication ("F-AI1") from a PN.
Transmit a second frequency-domain availability indication ("F-AI2") to CNs.
Use resources in the resource sets for scheduling downlink and/or uplink channels for
communications with CNs and/or UEs such that:
Downlink resources and downlink-indicated flexible resources are used for
scheduling downlink channels,
Uplink resources and uplink-indicated flexible resources are used for scheduling
uplink channels,
Soft resources are used only if indicated available by F-AI1, and
Resources multiplexed with the resources indicated available by F-AI2 satisfy
constraints based on information of multi-panel capability and/or minimum guard
band of the CNs.
Transmit downlink signals on downlink channels and/or receive uplink signals on uplink
channels.

Figure 10:
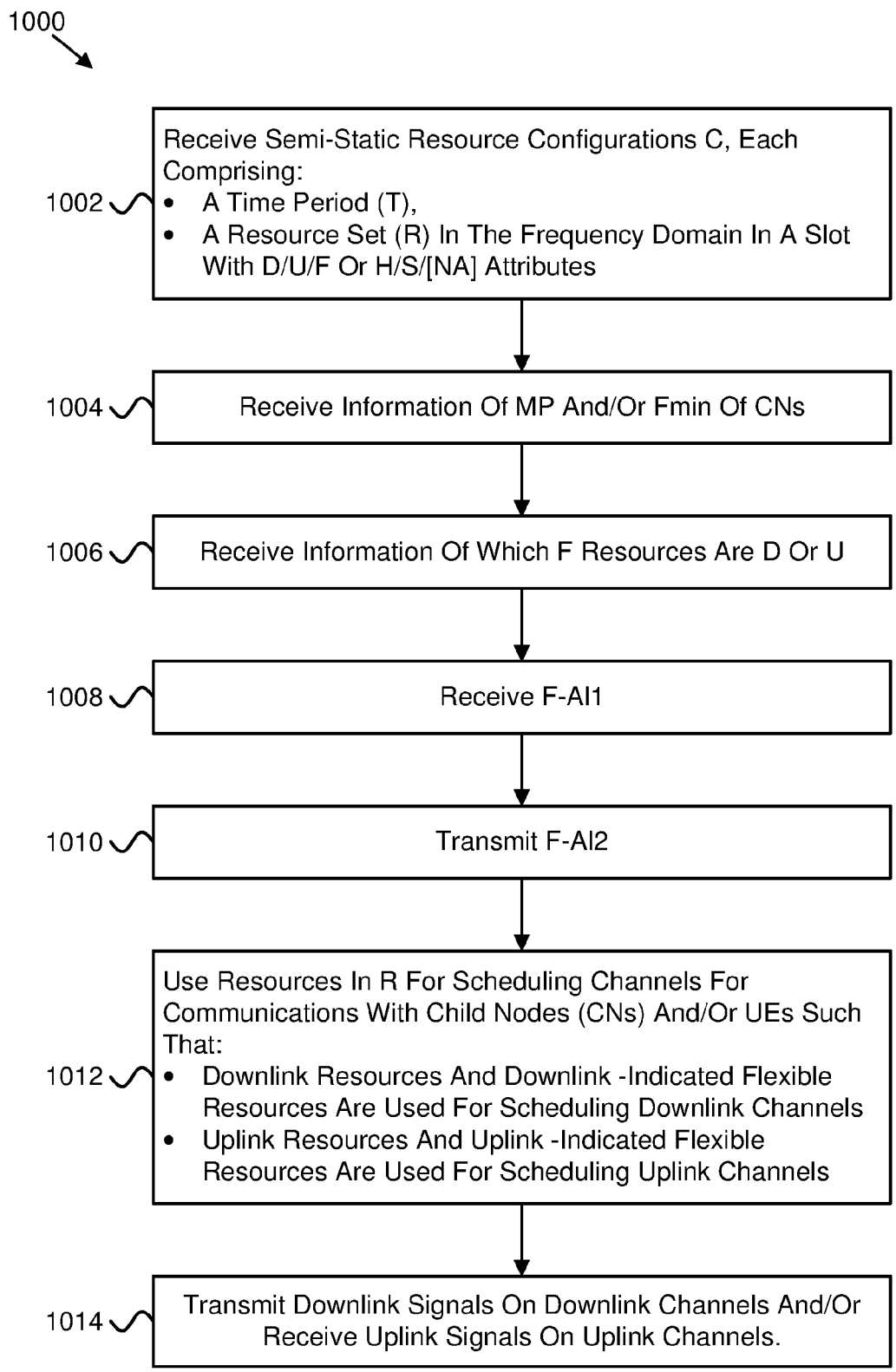
FIG. 10 is a flow chart diagram illustrating one embodiment of a hard and/or soft configuration.

FIG. 10 is a flow chart diagram 1000 illustrating one embodiment of a hard and/or soft configuration. The flow chart diagram 1000 includes a method for DU including: receiving 1002 semi-static resource configurations C, each including: a time period (T) and a resource set (R) in the frequency domain in a slot, wherein each resource in the resource set is configured as D, U, or F, and also configured as H or S; receiving 1004 information of MP and/or Fmin of CNs; receiving 1006 an indication of which flexible resources are downlink or uplink; receiving 1008 a F-AI1 from a PN; transmitting 1010 a F-AI2 to CNs; using 1012 communications with CNs and/or UEs such that: downlink resources and downlink-indicated flexible resources are used for scheduling downlink channels, uplink resources and uplink-indicated flexible resources are used for scheduling uplink channels, soft resources are used only if indicated available by F-AI1, and resources multiplexed with the resources indicated available by F-AI2 satisfy constraints based on information of multi-panel capability and/or minimum guard band of the CNs; and transmitting 1014 downlink signals on downlink channels and/or receive uplink signals on uplink channels.

In certain embodiments, a CU applies constraints in a way that DUs do not need to be cognizant of the constraints.

In some embodiments, resource configuration and indication features are used. In such embodiments, only time-domain resource configuration and indication features may be used. However, in other embodiments, frequency-domain features may be used to determine whether frequency-domain resources such as PRBs are available for each H, S, and/or NA symbol that is configured.

In various embodiments, availability of a resource on a time-frequency grid may be determined by two values in two domains, tables such as Table 6 and Table 7 may be used.

TABLE 6

|  | Hard | Soft | Not Available |
|---|---|---|---|
| Hard | Hard | Soft | Not Available |
| Soft | Soft | Soft | Not Available |
| Not Available | Not Available | Not Available | Not Available |

TABLE 7

|  | Hard | Soft | Not Available |
|---|---|---|---|
| Available | Hard | Soft | Not Available |
| Not Available | Not Available | Not Available | Not Available |

In Table 6 and Table 7, each column may represent a resource configuration and/or indication in the time domain, and each row may represent a resource configuration and/or indication in the frequency domain.

Table 7 may be used for remaining embodiments described herein. However, extension of the embodiments to Table 6 may also be made.

According to Table 7, any symbol no matter whether it is configured {D, U, F} may be further configured available or not available for a certain sub-band and/or set of PRBs in a BWP. Interpretation of frequency-domain configuration and/or indication for H, S, and/or NA symbols according to Table 7 may be as follows: H symbol: if a symbol is configured as hard, any part of it in the frequency domain that is configured available is treated as a H resource and any part of it that is configured not available is treated as a NA resource; S symbol: if a symbol is configured as soft, any part of it in the frequency domain that is configured available is treated as a S resource and any part of it that is configured not available is treated as a NA resource—a soft resource may be subject to an availability indication—moreover, any soft resource may be indicated available in the frequency domain; and NA symbol: if a symbol is configured as not available, all frequency-domain resources will be treated as a NA resource—as an example behavior rule, further configuration of availability in the frequency domain may not change the symbol from NA.

In some embodiments, a configuration of frequency-domain availability may be treated as a "mask" on top of a time-domain resource configuration.

Figure 11:
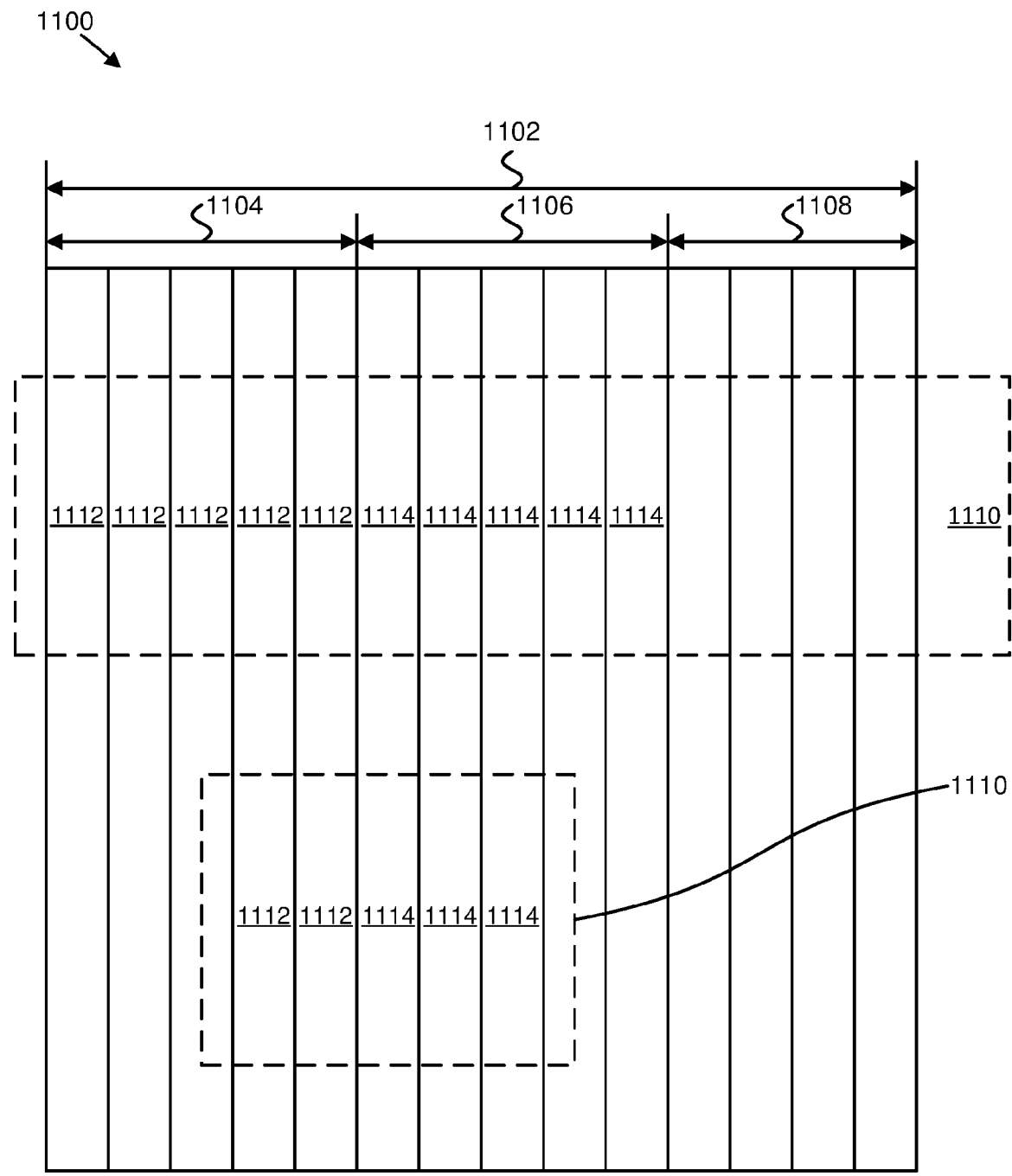
FIG. 11 is a diagram illustrating one embodiment of a configuration of frequency-domain availability.

FIG. 11 is a diagram 1100 illustrating one embodiment of a configuration of frequency-domain availability in a slot 1102. The slot includes hard symbols 1104, soft symbols 1106, and NA symbols 1108. A frequency-domain availability 1110 illustrates specific frequencies that include hard resources 1112 and soft resources 1114.

In various embodiments, if resources are configured as soft, they may be indicated as available by lower layers for a node to be able to allocate the resources for scheduling (e.g., dynamic indication of availability for soft resources).

TABLE 8

| Method for DU |
|---|
| Receive semi-static resource configurations C, each including: |
| a time period (T) and |
| a resource set (R) in time and/or frequency, wherein each resource in the resource set is configured as D, U, or F, and also configured as H or S. |
| Receive information about MP, minimum guard time ("Tmin"), and/or Fmin of CNs. |
| Receive an indication of which flexible resources are downlink or uplink. |
| Receive a T-AI1 and/or F-AI1 from a PN. |
| Transmit a second T-AI2 and/or F-AI2 to CNs. |
| Use resources in the resource sets for scheduling downlink and/or uplink channels for communications with CNs and/or UEs such that: |
| Downlink resources and downlink-indicated flexible resources are used for scheduling downlink channels, |
| Uplink resources and uplink-indicated flexible resources are used for scheduling uplink channels, |
| Soft resources are used only if indicated available by T-AI1 and/or F-AI1 based on a table specifying joint time-frequency availability, and |

TABLE 8-continued

Method for DU

Resources multiplexed with the resources indicated available by T-AI2 and/or F-AI2 satisfy constraints based on information of multi-panel capability, minimum guard time, and/or minimum guard band of the CNs.
Transmit downlink signals on downlink channels and/or receive uplink signals on uplink channels.

---

Figure 12:
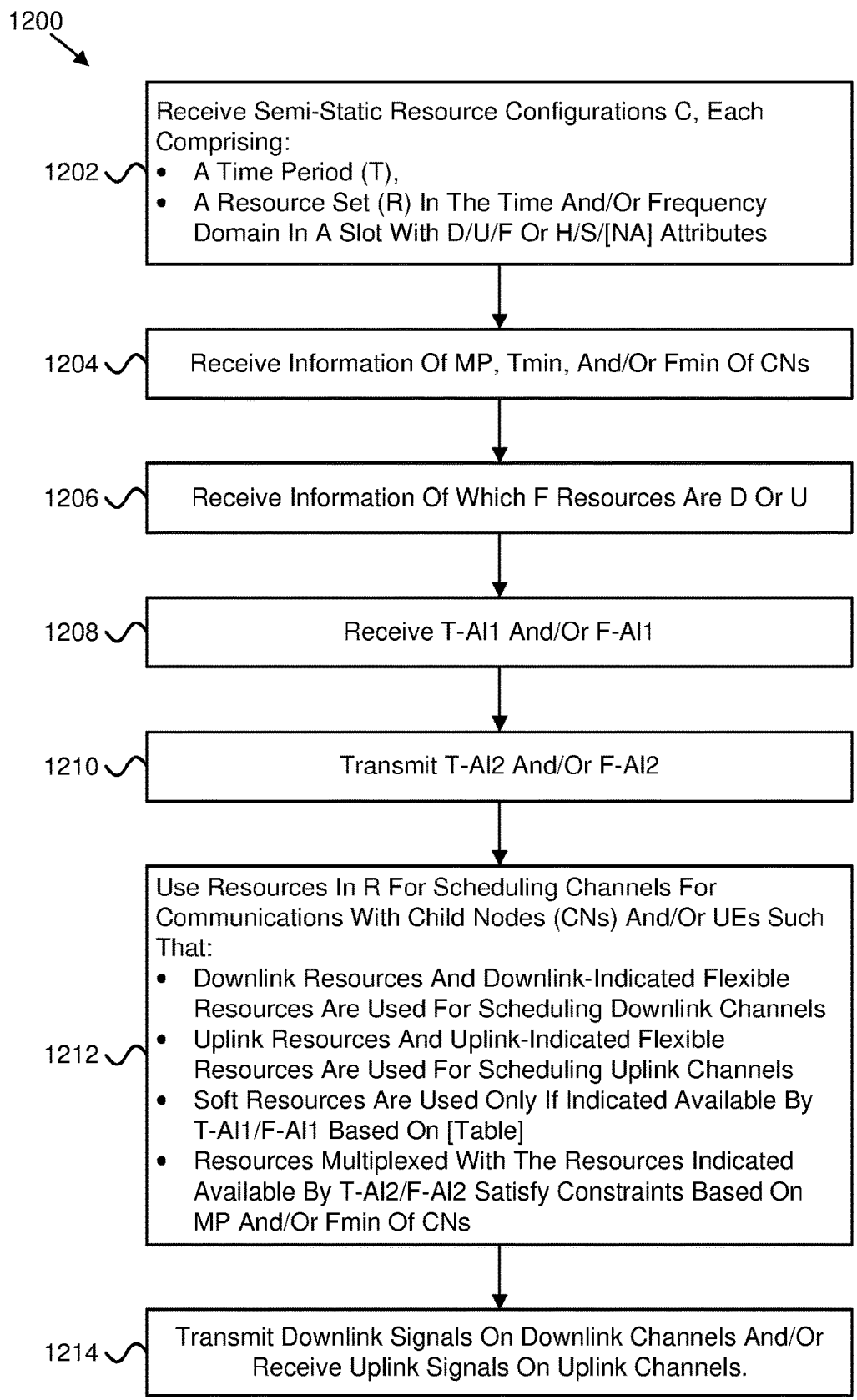
FIG. 12 is a flow chart diagram illustrating another embodiment of a hard and/or soft configuration.

FIG. 12 is a flow chart diagram 1200 illustrating another embodiment of a hard and/or soft configuration. The flow chart diagram 1200 illustrates a method for DU including: receiving 1202 semi-static resource configurations C, each including: a time period (T) and a resource set (R) in time and/or frequency, wherein each resource in the resource set is configured as D, U, or F, and also configured as H or S; receiving 1204 information about MP, Tmin, and/or Fmin of CNs; receiving 1206 an indication of which flexible resources are downlink or uplink; receiving 1208 a T-AI1 and/or F-AI1 from a PN; transmitting 1210 a second T-AI2 and/or F-AI2 to CNs; using 1212 resources in the resource sets for scheduling downlink and/or uplink channels for communications with CNs and/or UEs such that: downlink resources and downlink-indicated flexible resources are used for scheduling downlink channels, uplink resources and uplink-indicated flexible resources are used for scheduling uplink channels, soft resources are used only if indicated available by T-AI1 and/or F-AI1 based on a table specifying joint time-frequency availability, and resources multiplexed with the resources indicated available by T-AI2 and/or F-AI2 satisfy constraints based on information of multi-panel capability, minimum guard time, and/or minimum guard band of the CNs; and transmitting 1214 downlink signals on downlink channels and/or receive uplink signals on uplink channels.

In various embodiments, an IAB donor CU sends frequency-domain resource configurations to JAB node DUs to enable non-TDM modes of operation. In some embodiments, lower layer signaling may be used for indicating availability of resources on soft symbols that are configured. Certain advantage of such embodiments may be that it only affects lower layer specifications while the upper layers are compatible with prior versions. As a result, it may be easier to manage resources in a system of heterogeneous JAB nodes where some nodes have different compatibilities. In such embodiments, frequency-domain resource management may be local.

In some embodiments, resource configurations may be at a time domain (e.g., at a symbol-level granularity), but control signaling at a physical layer (e.g., L1) may be used to provide an indication of resources at a frequency domain. This may be called frequency-domain availability indication ("F-AI") and may be communicated by a new DCI format (e.g., DCI format 2_6) and/or a control message on a control channel (e.g., PDCCH). An availability indication ("AI") may also be called time-domain availability indication ("T-AI").

In certain embodiments, F-AI may be a bitmap where each bit represents availability in one PRB. However, this may use a large overhead, so a smaller granularity may be used. For example, a higher layer configuration may determine a number or group of PRBs as the granularity, such as a resource block group ("RBG"), and then a bitmap in the F-AI may indicate availability of each RBG.

In various embodiments, if the granularity at a frequency domain is a RBG, it may be noted that a RBG is configured by RRC signaling for each node. In some embodiments, for proper operation, an JAB node N may inform its PN of its RBG size. In certain embodiments, a PN may send its RBG size to N. In one example, the granularity at a frequency domain may be in terms of a different number of PRBs than a RBG size used for scheduling. The frequency domain granularity may be configured and/or determined based on the carrier bandwidth and/or operating frequency band.

In some embodiments, a start PRB and/or RBG and a number of PRBs and/or RBGs may be determined for contiguous F-AI. In such embodiments, a F-AI message (e.g., DCI format 2_6) may contain at least $\log_2[M(M+1)/2]$, where M is the number of PRBs and/or RBGs in an active BWP.

In certain embodiments, two different formats for granularity may be defined. In such embodiments, two DCI formats may be used or a field in DCI determines which format is used.

In various embodiments, in addition to DCI signaling, MAC signaling may facilitate reducing signaling overhead by activating and/or deactivating available frequency resources on top of an RRC resource configuration. In such embodiments, a MAC CE message may activate and/or deactivate different frequency resources in a semi-persistent manner. The activation and/or deactivation may be for all CNs, a group of CNs, or one CN. Moreover, an F-AI DCI may indicate which activated frequency resources are available for each instance.

Figure 13:
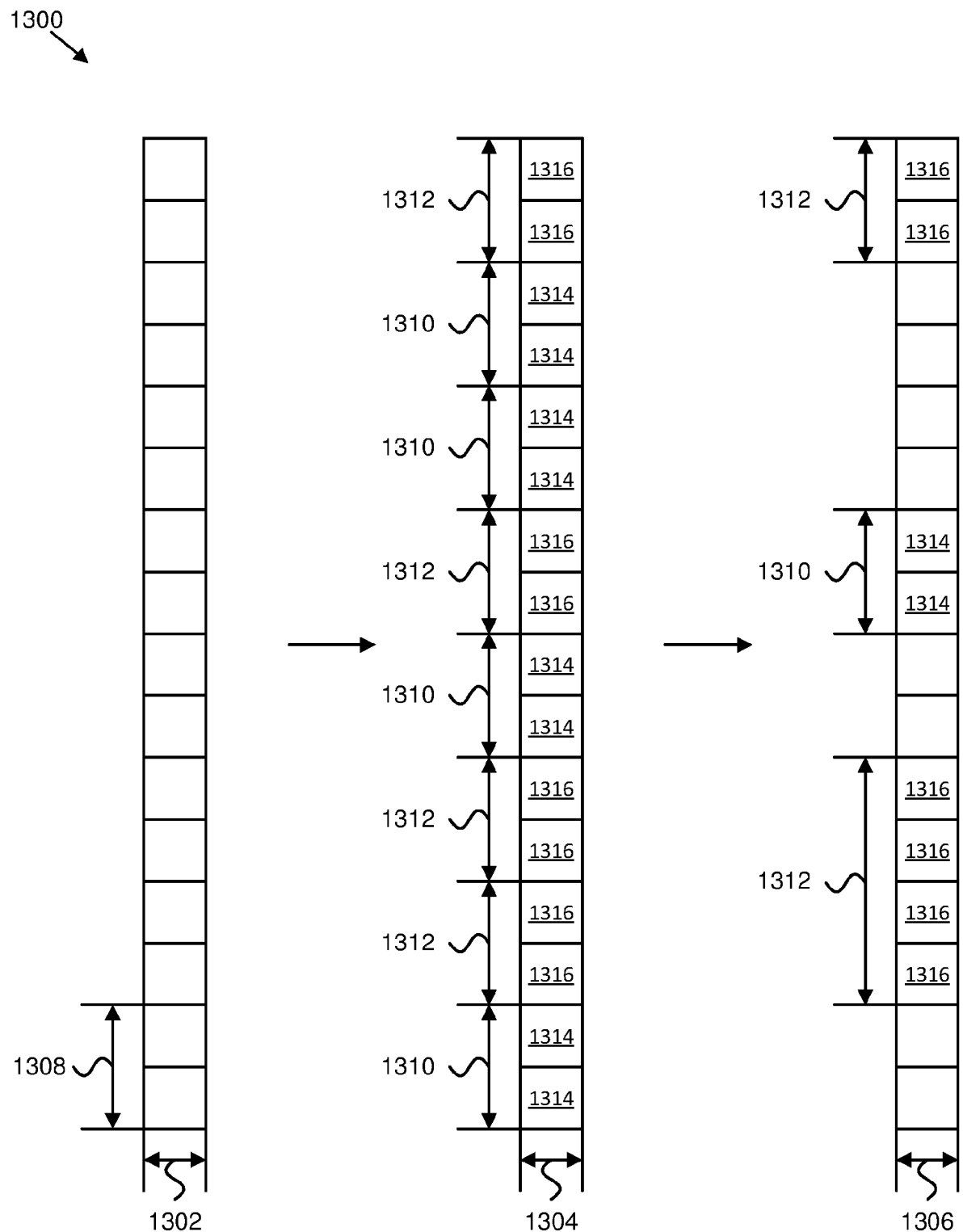
FIG. 13 is a block diagram illustrating one embodiment of activation and indication of frequency-domain availability ("F-AI")

In some embodiments, MAC signaling may activate and/or deactivate PRBs and/or RBGs using a bitmap field. In such embodiments, an F-AI bitmap field indicates whether each of the contiguous partitions activated by the MAC signaling are available. One example is illustrated in FIG. 13. Specifically, FIG. 13 is a block diagram 1300 illustrating one embodiment of F-AI. The block diagram 1300 illustrates RRC signaling 1302, a MAC message 1304, and DCI 1306. The RRC signaling 1302 configures a symbol as soft and a number of PRBs 1308 per RBG is configured as 2. Then, the MAC message 1304 activates 3 contiguous partitions of RBGs (e.g., inactive partitions 1310—with a value 1314 of "0", activated partitions 1312—activated with a value 1316 of "1"). Finally, the DCI message 1306 indicates 2 of the partitions are available (e.g., unavailable partitions 1310—having a value 1314 of "0", available partitions 1312—having a value 1316 of "1"). Since there are 3 contiguous partitions activated by the MAC message 1304 (e.g., activation bitmap="01101001"), the F-AI bitmap field contains 3 bits (e.g., "101").

Figure 14:
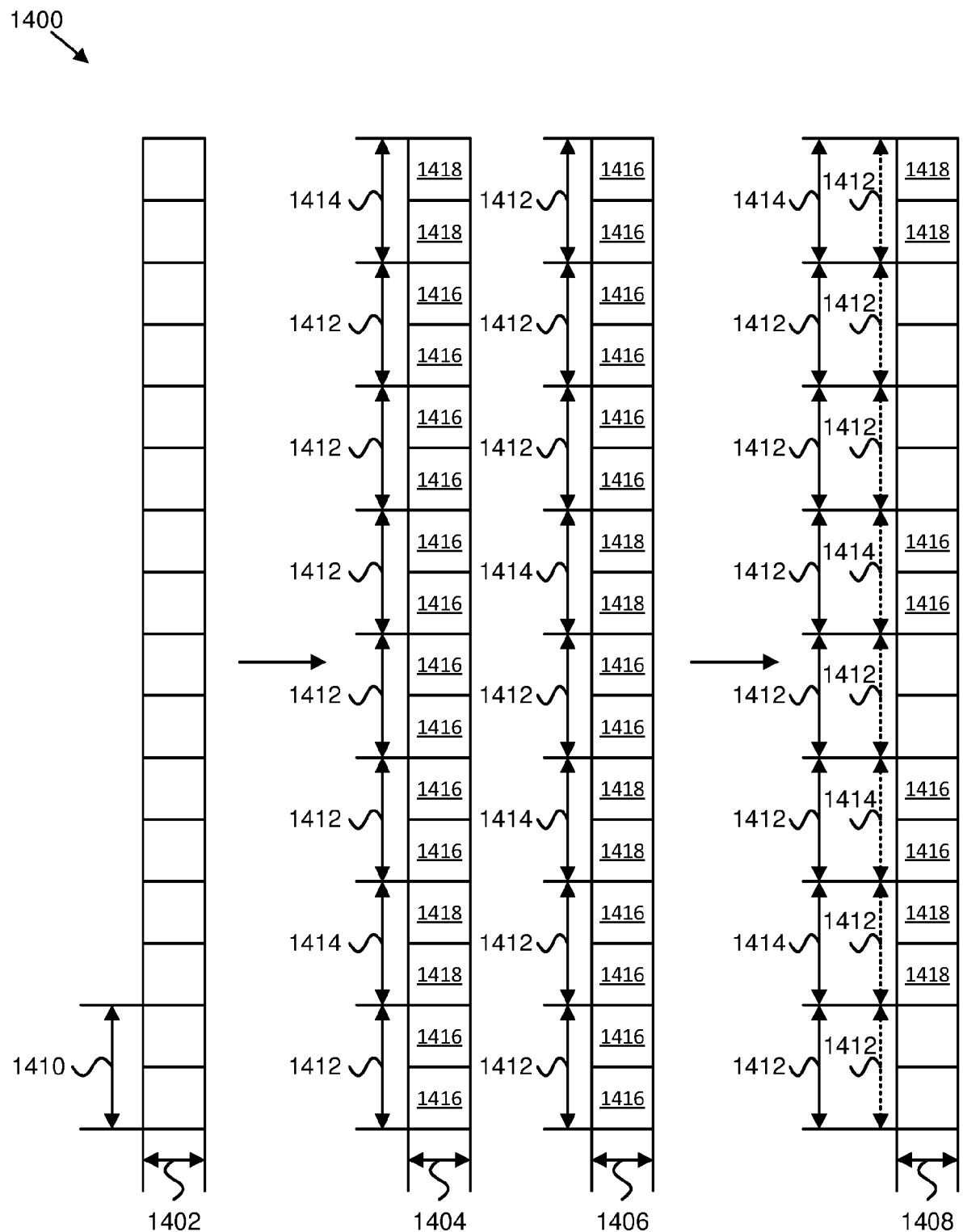
FIG. 14 is a diagram illustrating another embodiment of activation and indication of F-AI.

In certain embodiments, a MAC message includes more than one bitmap field, each field activating a number of PRBs and/or RBGs. Then, an F-AI bitmap field indicates whether the contiguous or non-contiguous partition activated by each of the bitmap fields in the MAC message is available. An example is illustrated in FIG. 14. Specifically, FIG. 14 is a diagram 1400 illustrating another embodiment of activation and indication of F-AI. The block diagram 1400 illustrates RRC signaling 1402, a first MAC message 1404, a second MAC message 1406, and DCI 1408. The RRC signaling 1402 configures a symbol as soft and a number of PRBs 1410 per RBG is configured as 2. Then, a first and second MAC messages 1404 and 1406 activate 2 partitions of RBGs, each with a separate bitmap fields (e.g., inactive partitions 1412—with a value 1416 of "0", activated partitions 1414—activated with a value 1418 of "1"). Finally, the DCI message 1408 indicates 1 of the partitions is available (e.g., unavailable partitions 1412—having a value 1416 of "0", available partitions 1414—having a value 1418 of "1"). Since there are 2 partitions activated by the MAC messages (e.g., activation bitmaps="01000001" and "00101000"), the F-AI bitmap field contains 2 bits (e.g., "10"). This embodiment provides more flexibility at the cost of a larger MAC overhead.

In various embodiments, a resource granularity of F-AI may be set to S-DL, S-UL, and/or S-F per slot. In such embodiments, one F-AI field, either a bitmap or a field in another format, applies to all of the frequency-domain resources on each one of: 1) all soft downlink symbols in a slot; 2) all soft uplink symbols in a slot; and/or 3) all soft flexible symbols in a slot.

In certain embodiments, since F-AI adds overhead, the following may be used to reduce overhead: 1) not all soft symbols may be indicated available in the frequency domain—or this reason, slots that may or may not be indicated available at the frequency domain may be distinguished by configuration—if a slot is not configured for F-AI, it may be treated similarly to a slot in other configurations; 2) not all slots have all types of D, U, and/or F symbols—therefore, if a slot does not have symbols of a certain type, F-AI for that type may be omitted—for example, suppose the standard specifications determine that F-AI in a DCI is to be indicated in this order: downlink, uplink, flexible—then, if a slot does not have any uplink symbols, F-AI will have two fields for downlink and flexible symbols, respectively; and/or 3) a new DCI format may be defined to have either or both T-AI and F-AI.

including: a time period (T) and a resource set (R) in the time domain, wherein each resource in the resource set is configured as D, U, or F, and also configured as H or S; receiving 1504 information indicating MP, Tmin, and/or Fmin of CNs; receiving 1506 an indication of which flexible resources are downlink or uplink; receiving 1508 a T-AI1 from a PN and/or a F-AI1 from a PN; transmitting 1510 a second T-AI2 to CNs and/or a second F-AI2 to CNs; using 1512 resources in the resource sets for scheduling downlink and/or uplink channels for communications with CNs and/or UEs such that: downlink resources and downlink-indicated flexible resources are used for scheduling downlink channels, uplink resources and uplink-indicated flexible resources are used for scheduling uplink channels, soft resources are used only if indicated available by T-AI1 and F-AI1 based on rules specifying joint time-frequency availability, and resources multiplexed with the resources indicated available by T-AI2 and/or F-AI2 satisfy constraints based on information indicating multi-panel capability, minimum guard time, and/or minimum guard band of the CNs; and transmitting 1514 downlink signals on downlink channels and/or receive uplink signals on uplink channels.

In some embodiments, FDM and/or SDM enhancements between upstream and downstream may be enabled by bandwidth part ("BWP") signaling. In such embodiments, a CU configures and/or activates different BWPs for different nodes such that transmission and reception in the configured and/or activated BWPs satisfy multiplexing constraints of nodes. In such embodiments: 1) TDM constraints may include Tmin; and/or 2) FDM and/or SDM constraints may include Fmin and/or multi-panel and/or duplexing constraints.

In various embodiments, to configure and/or activate BWPs, a CU may obtain certain information (e.g., described above) by signaling, configurations, and/or preconfigurations. The configuration and/or preconfiguration information may be received from the nodes, received from the network, stored on a static memory such as a read-only memory

TABLE 9

Method for DU

Receive semi-static resource configurations C, each including:
a time period (T) and
a resource set (R) in the time domain, wherein each resource in the resource set is configured as D, U, or F, and also configured as H or S.
Receive information indicating MP, Tmin, and/or Fmin of CNs.
Receive an indication of which flexible resources are downlink or uplink.
Receive a T-AI1 from a PN.
Receive a F-AI1 from a PN.
Transmit a second T-AI2 to CNs.
Transmit a second F-AI2 to CNs.
Use resources in the resource sets for scheduling downlink and/or uplink channels for communications with CNs and/or UEs such that:
Downlink resources and downlink-indicated flexible resources are used for scheduling downlink channels,
Uplink resources and uplink-indicated flexible resources are used for scheduling uplink channels,
Soft resources are used only if indicated available by T-AI1 and F-AI1 based on rules specifying joint time-frequency availability, and
Resources multiplexed with the resources indicated available by T-AI2 and/or F-AI2 satisfy constraints based on information indicating multi-panel capability, minimum guard time, and/or minimum guard band of the CNs.
Transmit downlink signals on downlink channels and/or receive uplink signals on uplink channels.

Figure 15:
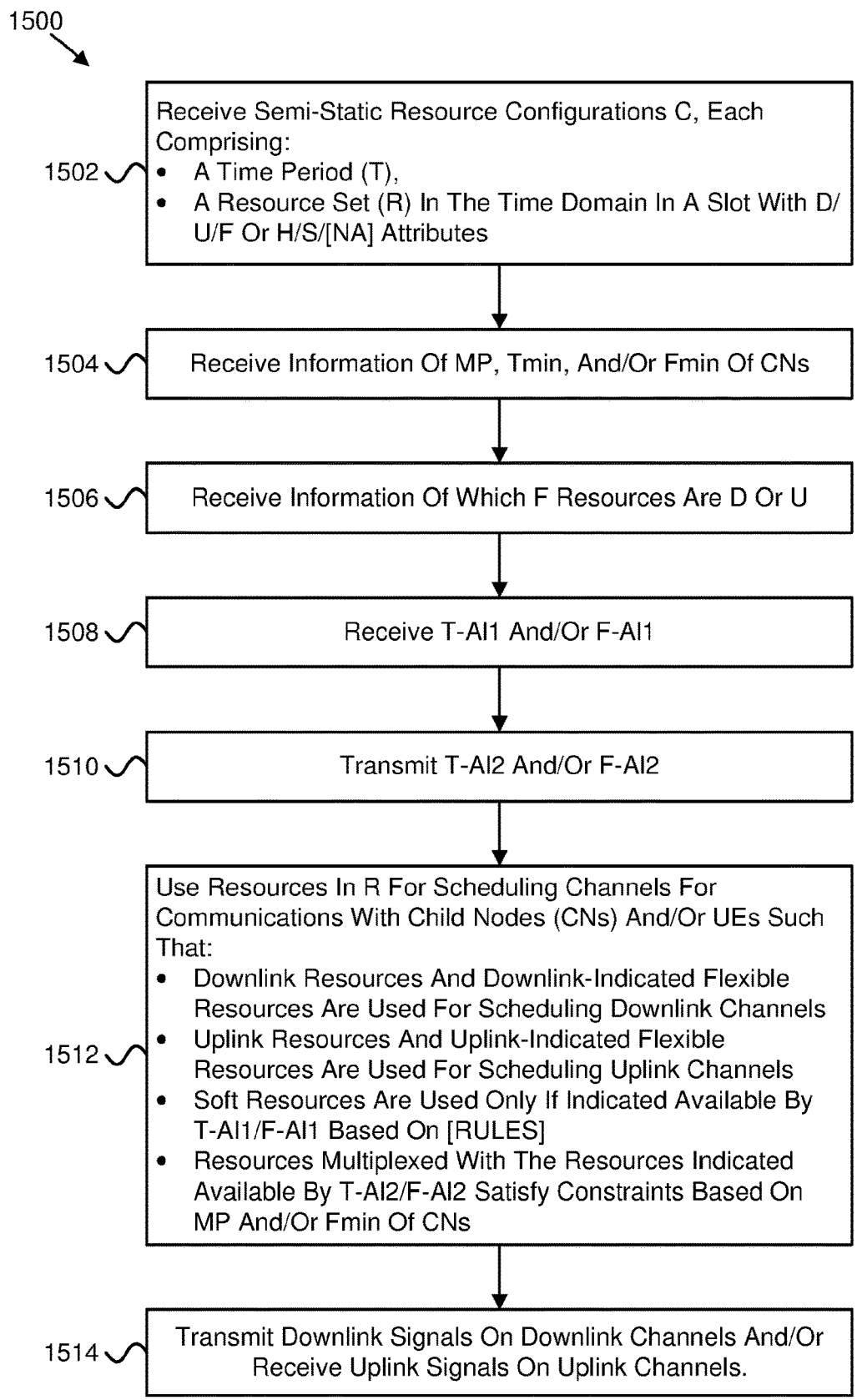
FIG. 15 is a flow chart diagram illustrating one embodiment of a compatible dynamic indication.

FIG. 15 is a flow chart diagram 1500 illustrating one embodiment of a compatible dynamic indication. The flow chart diagram 1500 may be for a method for DU including: receiving 1502 semi-static resource configurations C, each ("ROM"), preconfigured by an operator, and so forth. In such embodiments, the information may be provided according to standard specifications and/or methods agreed between vendors and/or operators. As may be appreciated, the information may be received using any described method herein in any embodiments described herein.

In certain embodiments, if configurations and/or activations are static, resources may be wasted due to dynamic traffic and/or dynamic topology. As may be appreciated, cellular data traffic may be dynamic and in bursts and, since aggregated traffic shows self-similar and heavy-tail properties, the aggregated traffic at each IAB node may be expected to be dynamic and in bursts at different time scales. At smaller time scales, a new file transfer may be an example of an event triggering a significant change in load. At larger time scales, a rush-hour urban traffic may introduce changes in the load compared to other times of a day.

In some embodiments, an IAB system topology may be subject to change, even if the IAB nodes are static. One reason for a topology change may be a temporary failure of an IAB node. Another reason for a topology change may be a deliberate topological change by a network and/or CU to accommodate new traffic conditions.

In various embodiments, each node may need different amounts of resources at different times, which may be controlled by changing a BWP. In certain embodiments, up to four BWPs may be configured for each direction of downlink and uplink, and switching between bandwidth parts may be possible by RRC reconfiguration, MAC CE signaling, or DCI.

In some embodiments, an issue with BWP switching in IAB systems may be that a balance among frequency resources provided for different JAB nodes need to be maintained by an entity that performs the BWP switching, which may be an IAB donor CU if using RRC configuration or a parent IAB-DU if using MAC CE or DCI signaling.

In various embodiments, a CU may be able to collect proper information and signal to BWP switching for multiple JAB nodes. In such embodiments, latency to perform this operation may be too large. Moreover, in such embodiments, for faster reaction to changes in traffic, lower-layer signaling may be used and JAB nodes may be enabled to control BWP switching.

In certain embodiments, N may want to switch BWPs for communication with a child IAB-MT. However, in such embodiments, multiplexing constraints in a multi-hop system may add up and limit choices for JAB nodes further in a downstream direction.

Figure 16:
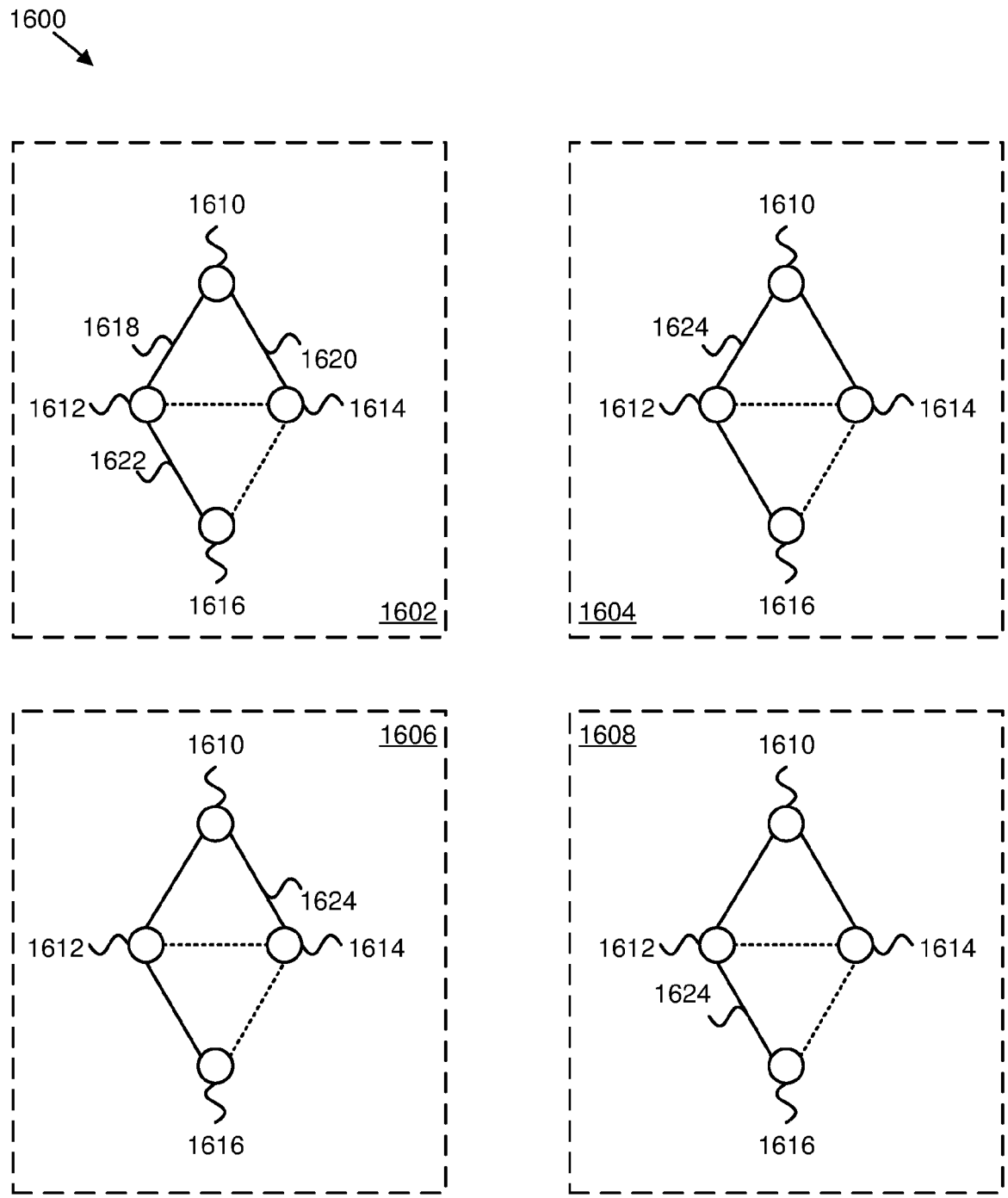
FIG. 16 is a diagram illustrating one embodiment of a resource allocation in an IAB system.

FIG. 16 is a diagram 1600 illustrating one embodiment of a resource allocation in an JAB system. The diagram 1600 includes a first example 1602, a second example 1604, a third example 1606, and a fourth example 1608. Each of the first example 1602, the second example 1604, the third example 1606, and the fourth example 1608 include a first node N1 1610, a second node N2 1612, a third node N3 1614, and a fourth node N4 1616.

In FIG. 16, N1 is a parent node of N2 and N3, and N4 is a child node of N2. It is assumed for simplicity that each node shares the same resources between DL BWP and UL BWP, hence the resulting FIG. 16 can be shown as undirected. Even if a node is multi-panel, the panels may be constrained to use non-overlapping resources.

Therefore, in the first example 1602, if a resource is used for link L12 1618, it cannot be used for link L13 1620 and vice versa. Similarly, if a resource is used for link L12 1618, it cannot be used for link L24 1622 and vice versa. Furthermore, there is cross-link interference between N3 and each of N2 and N4. Therefore, each resource in the time-frequency grid can only be used by one of the links L12, L13, and L24 as shown in the second example 1604, the third example 1606, and the fourth example 1608 by a used link 1624, respectively.

In FIG. 16, N2 may control BWP activation for L24 in a way that the active BWP for L24 does not overlap with the active BWP for L12. However, N2 does not have information of, or control over, the active BWP on L13. Therefore, there is a possibility of an excessive CLI from N3 on N2 and/or N4 or vice versa.

In certain embodiments, since JAB nodes are not aware of all the BWP configurations, the multi-hop JAB topology, CLI, and so forth, the IAB nodes may not be able to satisfy different constraints if switching BWPs. In some embodiments, an IAB donor CU may be enabled to send, along BWP configurations, additional information for switching BWPs. By obtaining this information, for example, an IAB node may be able to react to signaling for BWP switching from a parent IAB-DU by signaling for BWP switching to a child IAB-MT. In various embodiments, an JAB node may be able to select a BWP ID for a child IAB-MT upon receiving a BWP combination ID from a parent IAB-DU.

In some embodiments, each JAB node receives a subset of BWP IDs that it may indicate for downstream communication with a child IAB-MT, wherein the subset is associated with a BWP ID in the upstream direction with a parent IAB-DU. Then, if a BWP1 is active in the upstream, the JAB node may activate a BWP2 for downstream only if BWP2 is in the subset of the BWP IDs associated with BWP1.

Figure 17:
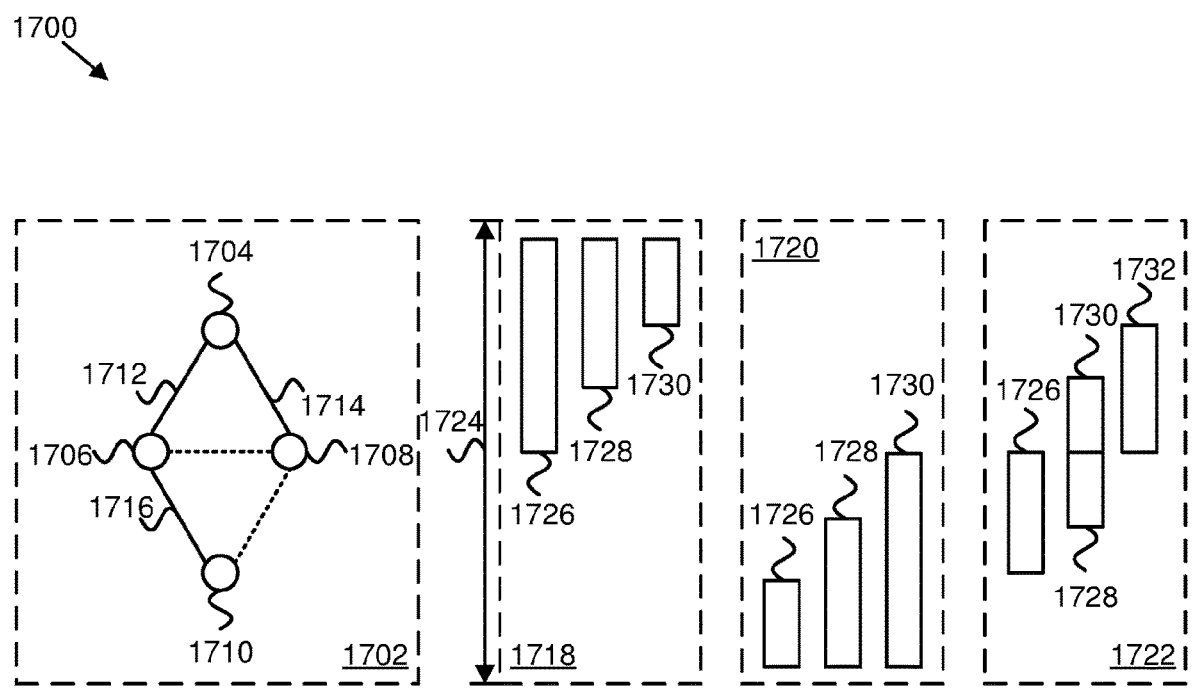
FIG. 17 is a block diagram illustrating one embodiment of BWP configurations.

FIG. 17 is a block diagram 1700 illustrating one embodiment of BWP configurations. The diagram 1700 includes a link diagram 1702 which includes a first node N1 1704, a second node N2 1706, a third node N3 1708, and a fourth node N4 1710. In FIG. 17, N1 is a parent node of N2 and N3, and N4 is a child node of N2. Moreover, the link diagram 1702 includes link L12 1712, link L13 1714, and link L24 1716. Furthermore, the block diagram 1700 illustrates BWPs 1718 for L13, BWPs 1720 for L24, and BWPs 1722 for L12 over available bandwidth 1724. BWPs 1718, 1720, and 1722 include BWPs "0" 1726, "1" 1728, "2" 1730, and "3" 1732.

In FIG. 17, at most 4 BWPs are configured per child node of a parent node (e.g., per link). It may be assumed that uplink BWPs and downlink BWPs occupy the same frequency resources. However, the method is applicable to asymmetric BWP configurations in downlink and uplink as well.

It can be seen in FIG. 17 that some BWP combinations work (e.g., (0, 0, 0), (1, 2, 1), and (2, 3, 2)), where the values in each tuple represent BWP IDs for L13, L24, and L12, respectively. However, other BWP combinations may not work (e.g., (1, 2, 3) results in an overlap between BWPs of L13 and L12).

In certain embodiments, JAB nodes may receive the information for BWP activation shown in Table 10.

TABLE 10

|  | Configuration for N2 | | | |
| --- | --- | --- | --- | --- |
| BWP ID for L12 | 0 | 1 | 2 | 3 |
| List of possible BWP IDs for L24 | 0 | 0, 1 | 0, 1, 2 | 0, 1, 2 |

It should be noted that the information in Table 10 may be received by configurations from the CU, which may be included in BWP configuration messages or received in separate configuration messages.

In some embodiments, by proper configuration from the IAB donor CU, a balance may be maintained between frequency resources available for different IAB nodes.

In various embodiments, configurations from an IAB donor CU may be expected to satisfy constraints introduced by capability information such as minimum guard band, multi-panel and/or duplexing capabilities, CSI and CLI information, and so forth. The capability information may be obtained by signaling or other means.

Figure 18:
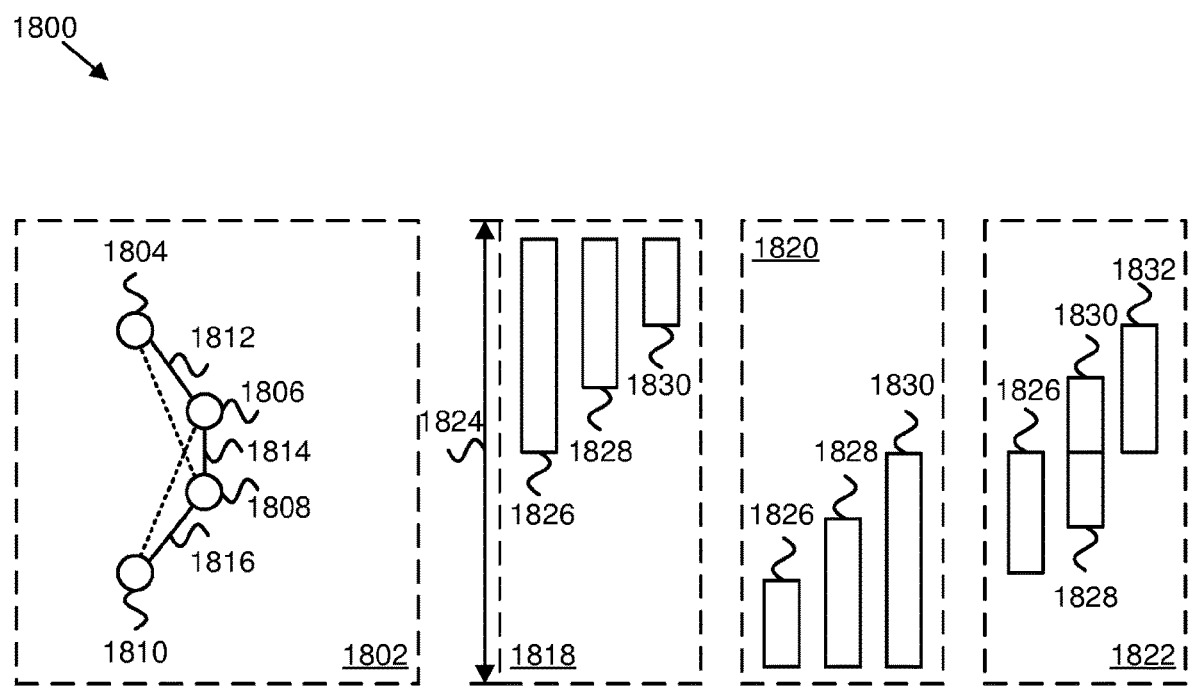
FIG. 18 is a diagram illustrating another embodiment of BWL configurations.

In certain embodiments, a large number of combinations are possible because of the simple topology and proper configurations. FIG. 18 illustrates another example, which has similar BWP configurations for different links, but for an IAB system with a different topology.

FIG. 18 is a diagram 1800 illustrating another embodiment of BWP configurations. The diagram 1800 includes a link diagram 1802 which includes a first node N1 1804, a second node N2 1806, a third node N3 1808, and a fourth node N4 1810. In FIG. 18, N1 is a parent node of N2 and N3, and N4 is a child node of N2. Moreover, the link diagram 1802 includes link L12 1812, link L23 1814, and link L34 1816. Furthermore, the block diagram 1800 illustrates BWPs 1818 for L12, BWPs 1820 for L23, and BWPs 1822 for L34 over available bandwidth 1824. BWPs 1818, 1820, and 1822 include BWPs "0" 1826, "1" 1828, "2" 1830, and "3" 1832.

In this example, IAB nodes receive the information indicated in Table 11 and Table 12 for BWP activation.

TABLE 11

|  | Configuration for N2 | | |
| --- | --- | --- | --- |
| BWP ID for L12 | 0 | 1 | 2 |
| List of possible BWP IDs for L23 | 0 | 0, 1 | 0, 1, 2 |

TABLE 12

|  | Configuration for N3 | | |
| --- | --- | --- | --- |
| BWP ID for L23 | 0 | 1 | 2 |
| List of possible BWP IDs for L34 | 0 | 1, 2 | 3 |

In some embodiments, several useful combinations may not be possible, which may result in wasting bandwidth or reducing flexibility. For example, the BWP ID combination (0, 1, 1) may not be possible by the above configuration, and if the CU intended to allow this combination, then the combination (1, 1, 2) would not be possible.

Therefore, in various embodiments, combinations of different BWPs are determined and numbered by BWP combination IDs. This may be performed by the CU and the information may be sent to JAB nodes. Then, for BWP activation, a BWP combination ID may be sent in addition to, or instead of, a BWP ID. In certain embodiments, JAB nodes may activate BWPs efficiently without a need for each JAB node to obtain knowledge of the topology, node capabilities, CLI, and so forth, which may only be collectively available at the CU.

According to various embodiments, JAB nodes may receive the information found is in Table 13.

TABLE 13

| BWP combination ID | BWP ID for L12 (received by N1 and N2) | BWP ID for L23 (received by N2 and N3) | BWP ID for L34 (received by N3 and N4) |
| --- | --- | --- | --- |
| 0 | 0 | 0 | 0 |
| 1 | 0 | 1 | 1 |
| 2 | 1 | 0 | 0 |
| 3 | 1 | 1 | 1 |
| 4 | 1 | 1 | 2 |
| 5 | 2 | 1 | 1 |
| 6 | 2 | 1 | 2 |
| 7 | 2 | 2 | 3 |

In Table 13, a BWP combination such as BWP combination ID 0 may be considered default, which then may be used to determine the default BWP ID for each of the nodes and/or links.

It should be noted that not all combinations need to be assigned a combination ID. For example, the combination (2, 0, 1) is not assigned a combination ID, because it may result in wasting a large bandwidth. The CU can therefore maintain a balance between resource utilization, node capabilities, CLI, and so forth, by defining proper BWPs and BWP combinations and without a need to continuously manage BWP activation in a fully centralized manner. The number of combination IDs may determine a bit-width for a DCI or a MAC control element ("CE") message that carries a BWP combination ID.

For the sake of simplicity, links may be assumed symmetric between uplink and downlink and BWP IDs may be associated with links. In certain embodiments, a DL BWP and an UL BWP of a link between two nodes may not occupy the same resources and BWP IDs may be equivalently associated with a child JAB node or, more specifically, a child-MT.

In some BWP-based methods, an JAB node may select a BWP from a number of BWPs configured by an CU and indicated or down-selected by the CU or a parent node. However, if the JAB node has multiple options for selecting a BWP, it may consider other criteria for bandwidth part selection. For example, if the IAB-node may attempt to avoid selecting a downstream BWP that overlaps in resources with an active upstream BWP. If the attempt is not successful, and an overlap cannot be avoided, the JAB node may transmit an error message to a parent node and/or to the CU informing them of the overlap. Then, in response, the parent node may activate a different BWP for the JAB node, or the CU may change BWP configurations that avoid the overlap.

In various embodiments, JAB nodes may need to support a larger number of BWPs than four. The maximum number of BWPs may be a node capability that may be reported for each of downlink and uplink directions. Consequently, either the number of bits in the DCI field for BWP switching may be made flexible or a maximum of four of the active BWPs may be down-selected by signaling (e.g., a MAC CE signaling, and then a DCI field selects one of the down-selected BWPs).

In certain embodiments, provisions may be made to accommodate error cases if there is BWP switching by DCI. Since DCI may fail to be received by an JAB node, a default BWP is indicated to be used if no communications are received from a parent JAB node for a certain period. However, the default BWP for an IAB-MT may need to change to avoid a conflict with an active BWP with a parent IAB-DU. For this purpose, each BWP may be associated with a subset of BWP IDs in the downstream as the default BWP. Then, if BWP switching occurs by a parent IAB-DU to a new BWP1 and if the current default BWP for a child IAB-MT is not in the subset of BWP IDs associated with BWP1, the IAB node may signal to the child IAB-MT to change its default BWP to a new BWP2 that is in the subset.

In some embodiments, an IAB-node may select a BWP for IAB-DU based on the BWP used for IAB-MT. The BWP may be selected based on minimal overlap with IAB-MT BWP and/or configured based on a look-up table by the PN and/or determined based on a pre-defined rule or pattern (e.g., based on IAB-MT BWP ID and/or IAB-node ID).

TABLE 14

Method for CU

Receive or configure information a topology, route, CSI, traffic intensity, CLI, MP, and/or Fmin.
Receive information indicating bandwidth part capability of IAB nodes.
Send configurations C, each including:
a bandwidth part identifier (ID),
information of a bandwidth part (B), and
a subset of bandwidth part IDs (I) associated with B,
such that:
a location of a bandwidth parts in the frequency domain is determined based on at
least one information of channel state, traffic intensity, and/or cross-link interference;
guard bands between bandwidth parts are determined based on information about
topology (e.gl, what node is what other node's parent node), multi-panel capability,
and/or minimum guard band; and
a number of bandwidth configurations for an IAB node constrained by the
bandwidth part capability of the IAB node.

TABLE 15

Method for DU

Send information indicating bandwidth part capability of the IAB node.
Receive configurations C, each including:
a bandwidth part identifier (ID),
information of a bandwidth part (B), and
a subset of bandwidth part IDs (I) associated with B.
Receive a first message indicating a first bandwidth part B1 by indicating an associated
bandwidth part identifier ID1.
Transmit a second message including a second bandwidth part B2 by indicating an
associated bandwidth part identifier ID2, wherein ID2 is in the subset of BWP IDs I1
associated with B1.

Figure 19:
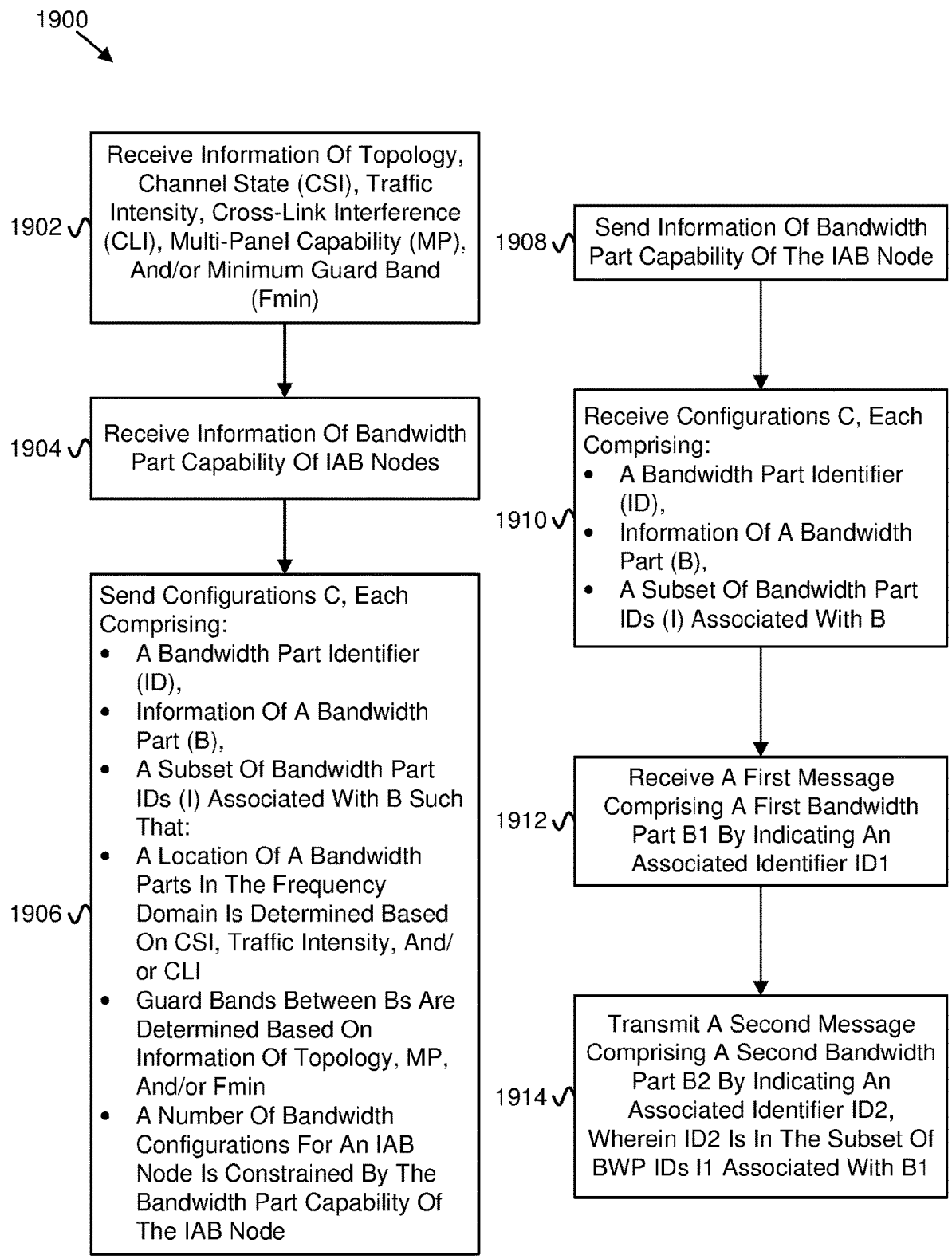
FIG. 19 is a flow chart diagram illustrating one embodiment of methods based on bandwidth parts.

FIG. 19 is a flow chart diagram 1900 illustrating one embodiment of methods based on bandwidth parts. The flow chart diagram 1900 includes a method for a CU including: receiving 1902 or configuring information a topology, route, CSI, traffic intensity, CLI, MP, and/or Fmin; receiving 1904 information indicating bandwidth part capability of IAB nodes; and sending 1906 configurations C, each including: a bandwidth part identifier (ID), information of a bandwidth part (B), and a subset of bandwidth part IDs (I) associated with B, such that: a location of a bandwidth parts in the frequency domain is determined based on at least one information of channel state, traffic intensity, and/or cross-link interference; guard bands between bandwidth parts are determined based on information about topology (e.gl, what node is what other node's parent node), multi-panel capability, and/or minimum guard band; and a number of bandwidth configurations for an JAB node constrained by the bandwidth part capability of the JAB node.

The flow chart diagram 1900 includes a method for a DU including: sending 1908 information indicating bandwidth part capability of the JAB node; receiving 1910 configurations C, each including: a bandwidth part identifier (ID), information of a bandwidth part (B), and a subset of bandwidth part IDs (I) associated with B; receiving 1912 a first message indicating a first bandwidth part B1 by indicating an associated bandwidth part identifier ID1; and transmitting 1914 a second message including a second bandwidth part B2 by indicating an associated bandwidth part identifier ID2, wherein ID2 is in the subset of BWP IDs I1 associated with B1.

TABLE 16

Method for CU

Receive or configure information for topology, route, CSI, traffic intensity, CLI, MP, and/or Fmin.
Receive information indicating bandwidth part capability of IAB nodes.
Send configurations C, each including:
a bandwidth part identifier ("ID") and
information of a bandwidth part (B)
such that:
a location of a bandwidth part in the frequency domain is determined based on
information of channel state, traffic intensity, and/or cross-link interference;
guard bands between bandwidth parts are determined based on information of
topology (e.g., what node is what other node's parent node), multi-panel capability,
and/or minimum guard band; and
a number of bandwidth configurations for an IAB node is constrained by the
bandwidth part capability of the IAB node.
Send configurations D, each including:
a bandwidth part combination identifier (J) and
a list of bandwidth part IDs (I)

TABLE 16-continued

Method for CU such that:
bandwidth parts associated with the list of bandwidth part IDs satisfy constraints
based on cross-link interference, topology (e.g., what node is what other node's
parent node), multi-panel capability, and/or minimum guard band.

TABLE 17

Method for IAB node

Send information of bandwidth part capability of the IAB node.
Receive configurations C, each including:
a bandwidth part identifier (ID) and
information of a bandwidth part (B).
Receive configurations D, each including:
a bandwidth part combination identifier (J) and
a list of bandwidth part IDs (I).
Receive a first message including a first bandwidth part B1 by indicating an associated
bandwidth part identifier ID1.
Receive a bandwidth part combination identifier J1.
Transmit a second message including a second bandwidth part B2 by indicating an
associated identifier ID2, wherein ID2 is in the list of bandwidth part identifiers included
by the bandwidth part configuration with the bandwidth part combination identifier J1.
Transmit the bandwidth part combination identifier J1.

Figure 20:
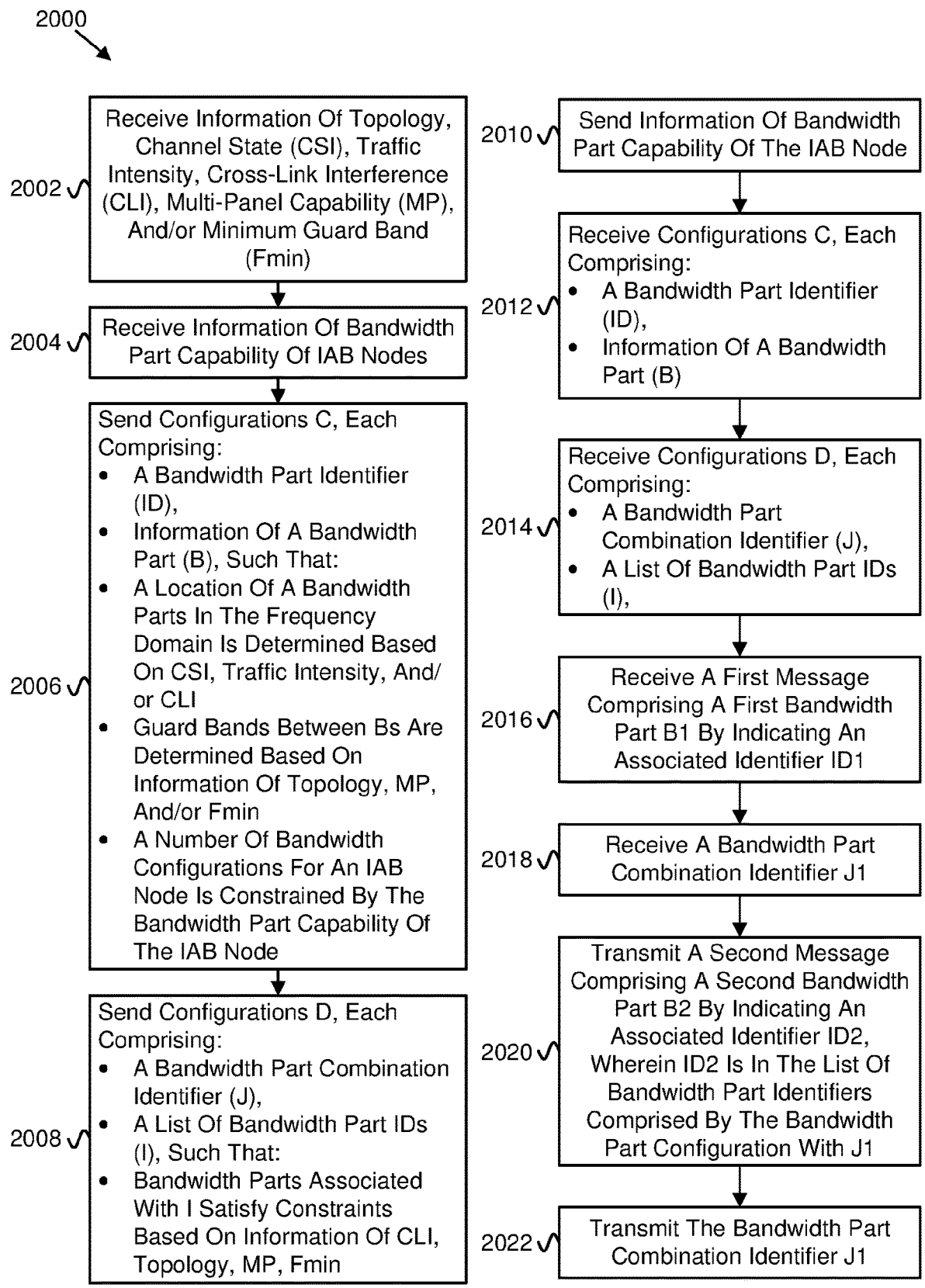
FIG. 20 is a flow chart diagram illustrating another embodiment of methods based on bandwidth parts.

FIG. 20 is a flow chart diagram 2000 illustrating another embodiment of methods based on bandwidth parts. The flow chart diagram 2000 includes a method for a CU including: receiving 2002 or configuring information for topology, route, CSI, traffic intensity, CLI, MP, and/or Fmin; receiving 2004 information indicating bandwidth part capability of JAB nodes; sending 2006 configurations C, each including: a bandwidth part identifier ("ID") and information of a bandwidth part (B) such that: a location of a bandwidth part in the frequency domain is determined based on information of channel state, traffic intensity, and/or cross-link interference; guard bands between bandwidth parts are determined based on information of topology (e.g., what node is what other node's parent node), multi-panel capability, and/or minimum guard band; and a number of bandwidth configurations for an JAB node is constrained by the bandwidth part capability of the JAB node; and sending 2008 configurations D, each including: a bandwidth part combination identifier (J) and a list of bandwidth part IDs (I) such that: bandwidth parts associated with the list of bandwidth part IDs satisfy constraints based on cross-link interference, topology (e.g., what node is what other node's parent node), multi-panel capability, and/or minimum guard band.

The flow chart diagram 2000 also includes a method for an JAB node including: sending 2010 information of bandwidth part capability of the JAB node; receiving 2012 configurations C, each including: a bandwidth part identifier (ID) and information of a bandwidth part (B); receiving 2014 configurations D, each including: a bandwidth part combination identifier (J) and a list of bandwidth part IDs (I); receiving 2016 a first message including a first bandwidth part B1 by indicating an associated bandwidth part identifier ID1; receiving 2018 a bandwidth part combination identifier J1; transmitting 2020 a second message including a second bandwidth part B2 by indicating an associated identifier ID2, wherein ID2 is in the list of bandwidth part identifiers included by the bandwidth part configuration with the bandwidth part combination identifier J1; and transmitting 2022 the bandwidth part combination identifier J1.

In some embodiments, although explicit indication is simple, it may impose signaling overhead. Therefore, implicit methods may be adopted instead of, or in addition to, explicit methods for indicating frequency-domain availability.

In certain embodiments, an example of implicit indication is that, except if an IAB node has full-duplex antennas, it may avoid transmitting or receiving signals simultaneously on the same resources on a same antenna and/or panel. In such embodiments: 1) single-panel node: the node must avoid transmitting or receiving signals on the same resource simultaneously; and 2) multi-panel node—the node must only allow transmitting or receiving signals on the same resources if the simultaneous operations are to be performed by different antenna panels and the cross-panel interference is not an issue.

In various embodiments, if a PN of an IAB node N schedules a communication on resources that are otherwise available to N, the PN may need to mark scheduled resources as NA and refrain from scheduling communications with its own CNs or UEs on the NA resources.

In some embodiments, there may be an issue with timing of scheduling. In a "typical" case where a PN schedules a channel for a communication with N in a slot by transmitting a DCI format 1_0 and/or 1_1 in the PDCCH of the same slot. In such embodiments, N does not have sufficient time to receive and decode the DCI; realize that some otherwise available resources are occupied for a communication with PN; and then, avoid scheduling its own communications on those resources. Therefore, PN may transmit the scheduling DCI sufficiently in advance to inform N in a timely manner.

In certain embodiments, a minimum time for PN to transmit scheduling DCI in advance is a minimum time for N to receive and decode the DCI and produce its own scheduling DCI. This may be set to a constant by a standard, configuration, or otherwise set to an IAB node capability. This capability may be similar to timeDurationForQCL. However, since timeDurationForQCL may include a time for applying spatial parameters according to an indicated QCL, a new parameter shown in Table 18 may be used. This parameter may be specified by a standard or may be reported by an IAB node as a capability.

TABLE 18

| Parameter | Description |
| --- | --- |
| timeDurationForAI | Defines the minimum time duration required by the IAB node to perform PDCCH reception and produce a DCI for availability indication (AI/T-AI/F-AI). If the parameter is expressed in units of OFDM symbols, the IAB node may indicate one value of minimum number of OFDM symbols for each value of subcarrier spacing. |

In some embodiments, there may be FDM for a PDSCH transmission from a PN to a N and a PDSCH transmission from the N to a CN and/or a UE. Since N needs sufficient time to receive and decode DCI from the PN and, then, proceed to transmit DCI to the CN and/or the UE, a higher layer parameter k0 for N may be set to a value that is not smaller than a minimum threshold, which is equal to timeDurationForAI for N plus a minimum time duration that is required for N to transmit a DCI of its own in advance.

That is: $k0\_min(PN) := T\_min(N) + k0\_min(N)$.

In this equation, $k0\_min(PN)$ is the minimum value of k0 for a PDSCH from PN, $T\_min(N)$ is timeDurationForAI for N, and $k0\_min(N)$ is the minimum value of k0 for a PDSCH from N.

In one example there is a 2-hop system PN-N-UE. In this example, PN schedules a PDSCH transmission for N and N schedules a PDSCH transmission for UE. Since N can schedule a PDSCH transmission for UE with k0=0, a setting of $k0\_min(N) := 0$ may be made. Then, $k0\_min(PN)$ only depends on the minimum decoding time for N, which can be set to a constant $T\_min(N) := T\_min$.

In another example there is a 3-hop system PN-N-CN-UE. In this example, {PN, N, CN} may schedule PDSCH transmissions for {N, CN, UE}, respectively. Then, the minimum value for k0 takes the following recursive forms: $k0\_min(PN) := T\_min(N) + k0\_min(N)$ and $k0\_min(N) := T\_min(CN) + k0\_min(CN)$.

Since CN may schedule a PDSCH transmission for a UE with k0=0, a setting of $k0\_min(CN) := 0$ may be made. Therefore: $k0\_min(N) := T\_min(CN)$, and $k0\_min(PN) := T\_min(N) + T\_min(CN)$ Assuming, for simplicity, that $T\_min(N) := T\_min(CN) := T\_min$, the following may be obtained: $k0\_min(CN) := 0$, $k0\_min(N) := T\_min$, and $k0\_min(PN) := 2 \times T\_min$.

Such a recursive rule may be extended to a larger number of hops. For example, in an m-hop IAB system Nm-...-N1-N0-UE, assuming that all values of minimum DCI decoding time are identical, there is the following: $k0\_min(N0) := 0$, $k0\_min(N1) := T\_min$, $k0\_min(Nm) := m \times T\_min$.

A similar method may be applied to uplink communications or a combination of downlink and uplink communications where values of k2 may need to be further considered. The above calculations can be extended to the following.

PN transmits a PDSCH transmission to N; N receives a PUSCH transmission from CN: $k0\_min(PN) := T\_min(N) + k2\_min(N)$, and $k2\_min(N) := T\_min(CN) + k0\_min(CN)$.

PN transmits a PDSCH transmission to N; N transmits a PDSCH transmission to CN: $k0\_min(PN) := T\_min(N) + k0\_min(N)$, and $k0\_min(N) := T\_min(CN) + k0\_min(CN)$.

PN receives a PUSCH transmission from N; N transmits a PDSCH to CN: $k2\_min(PN) := T\_min(N) + k0\_min(N)$, and $k0\_min(N) := T\_min(CN) + k2\_min(CN)$.

PN receives a PUSCH transmission from N; N receives a PUSCH from CN: $k2\_min(PN) := T\_min(N) + k2\_min(N)$, and $k2\_min(N) := T\_min(CN) + k2\_min(CN)$.

TABLE 19

| Method for CU |
| --- |
| Receive or configure information including topology, MP, and/or timeDurationForAI (T_min) from a set of IAB nodes {N}.<br>Send configurations C to {N}, each configuration including:<br>values of k0 and k2,<br>such that:<br>information of which node is a PN or a CN of a node N in {N} is obtained from the information of topology, and<br>values of k0 and k2 for {PN, N, CN} for each node N in {N} follow the specified equations with values of T_min. |

Figure 21:
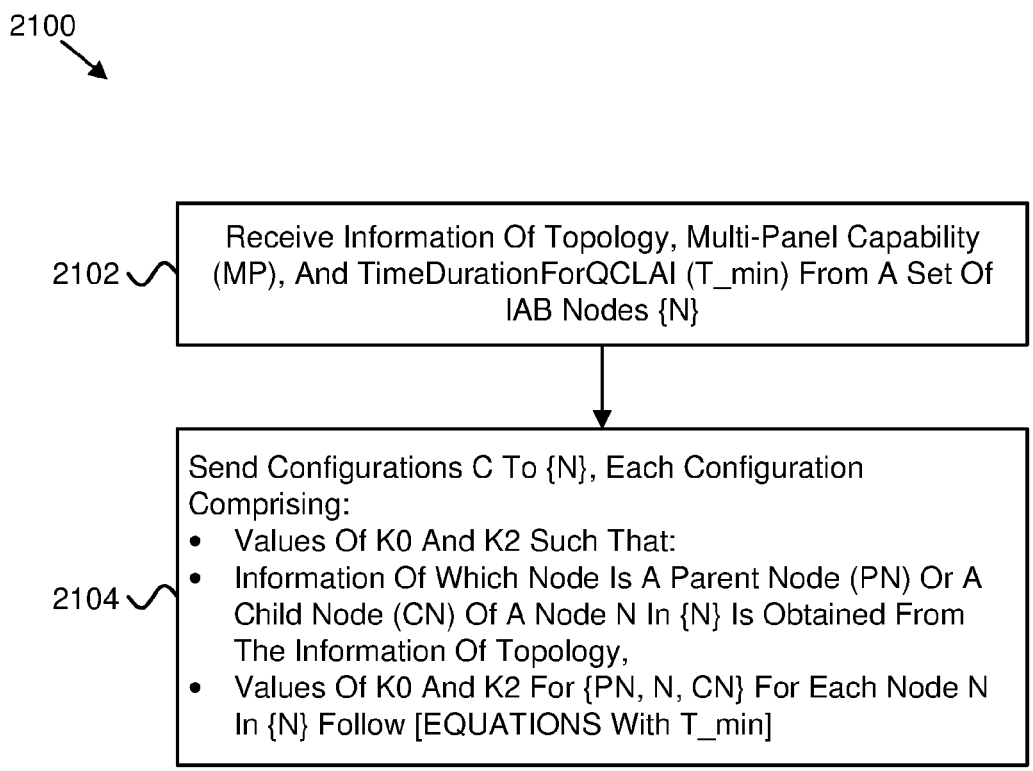
FIG. 21 is a flow chart diagram illustrating one embodiment of an implicit method.

FIG. 21 is a flow chart 2100 diagram illustrating one embodiment of an implicit method 2100 for a CU including: receiving 2102 or configuring information including topology, MP, and/or timeDurationForAI (T_min) from a set of IAB nodes {N}; and sending 2104 configurations C to {N}, each configuration including: values of k0 and k2, such that: information of which node is a PN or a CN of a node N in {N} is obtained from the information of topology, and values of k0 and k2 for {PN, N, CN} for each node N in {N} follow the specified equations with values of T_min.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")0, or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices, such as a CU, the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In various embodiments, a transmission configuration indicator ("TCI") state associated with a target transmission may indicate a quasi-collocation relationship between a target transmission (e.g., target RS of demodulation reference signal ("DM-RS") ports of the target transmission during a transmission occasion) and source reference signals (e.g., synchronization signal block ("SSB"), channel state information reference signal ("CSI-RS"), and/or sounding reference signal ("SRS")) with respect to quasi co-location type parameters indicated in a corresponding TCI state. A device may receive a configuration of multiple transmission configuration indicator states for a serving cell for transmissions on the serving cell (e.g., between a parent IAB-DU and IAB-node MT).

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

As described herein, entities may be referred to as IAB nodes. As may be appreciated, an embodiments that refer to IAB nodes, may also refer to IAB donors (which are IAB entities connecting the core network to the IAB network).

The different steps described for different embodiments herein may be permuted.

Each configuration described herein may be provided by one or more configurations. In some embodiments, an earlier configuration described herein may provide a subset of parameters while a later configuration may provide another subset of parameters. In certain embodiments, a later configuration may override values provided by an earlier configuration or a pre-configuration.

In various embodiments, a configuration may be provided by radio resource control ("RRC") signaling, medium-access control ("MAC") signaling, physical layer signaling such as a downlink control information ("DCI") message, and/or other means. Moreover, in such embodiments, a configuration may include a pre-configuration or a semi-static configuration provided by a standard, a vendor, a network, and/or an operator. Each parameter value received through a configuration or indication may override previous values for a similar parameter.

As may be appreciated, embodiments described herein may be applicable to wireless relay nodes and other types of wireless communication entities.

It should be noted that, an availability indication ("AI") in a time domain may be specified and/or predetermined. Moreover, a time-domain availability indication ("T-AI") may fully or partially refer to AI as specified and/or predetermined.

In some embodiments, vendor manufacturing IAB systems and/or devices and an operator deploying the IAB systems and/or devices may be enabled to negotiate capabilities of the systems and/or devices. In some embodiments, some of the information described may need signaling between entities and may be readily available to the devices. For example, by storing the information on a memory unit such as a read-only memory ("ROM"), exchanging the information using proprietary signaling methods, providing the information by a configuration and/or preconfiguration, or otherwise taking the information into account if creating hardware and/or software of the IAB systems and/or devices or other entities in a network. In this example, exchanging the information may be extended to embodiments in which the information is obtained by other methods.

In various embodiments, embodiments described herein may change based on a paired spectrum. As used herein, "HARQ-ACK" may represent collectively a positive acknowledge ("ACK") and a negative acknowledge ("NACK"). ACK may mean that a transport block ("TB") is correctly received while NACK (or NAK) may mean that a TB is erroneously received.

Figure 22:
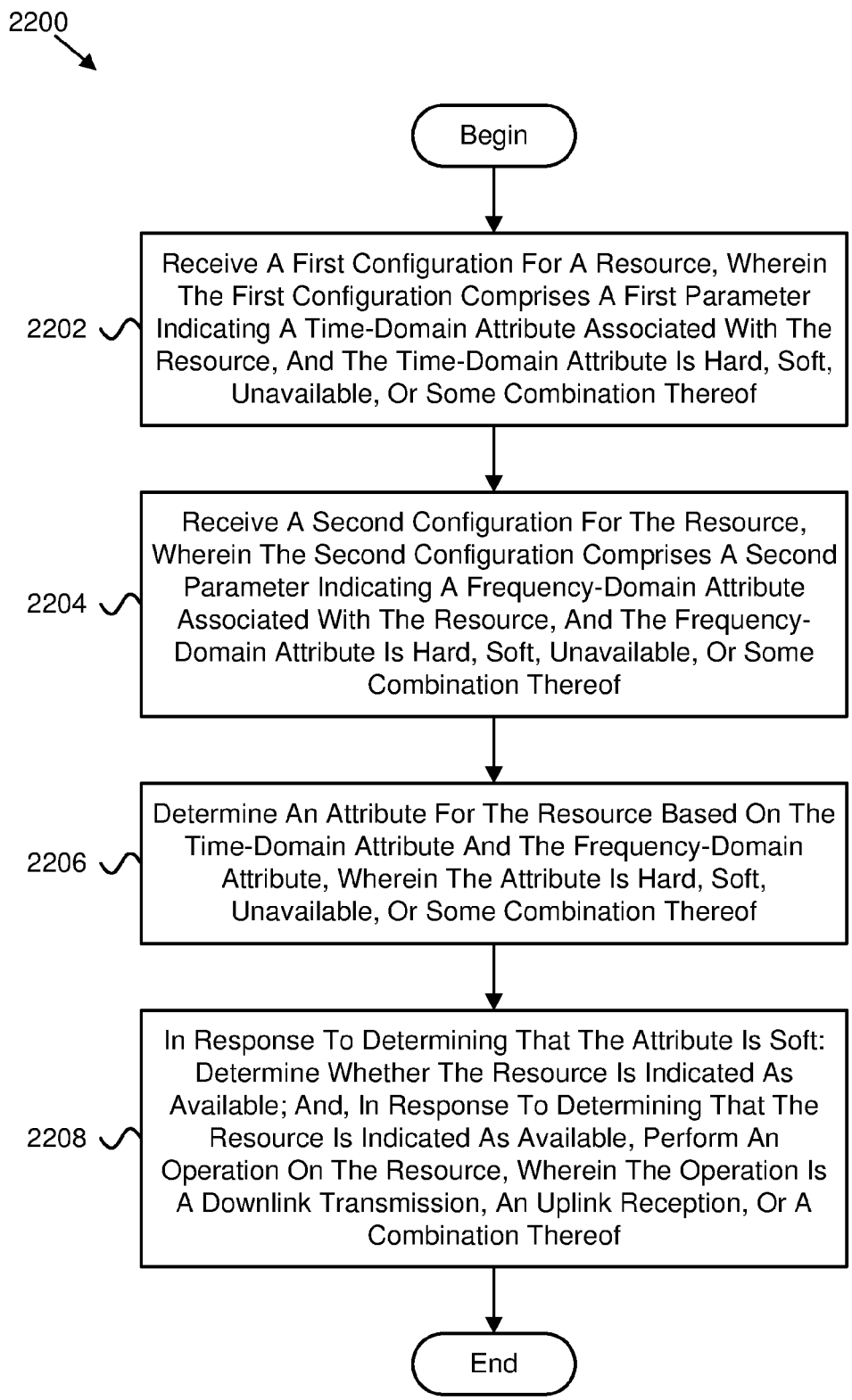
FIG. 22 is a flow chart diagram illustrating one embodiment of a method for resource attribute configuration.

FIG. 22 is a flow chart diagram illustrating one embodiment of a method 2200 for resource attribute configuration. In some embodiments, the method 2200 is performed by an apparatus, such as the remote unit 102. In certain embodiments, the method 2200 may be performed by a processor executing program code, for example, a microcontroller, a microprocessor, a CPU, a GPU, an auxiliary processing unit, a FPGA, or the like.

In various embodiments, the method 2200 includes receiving 2202 a first configuration for a resource. The first configuration includes a first parameter indicating a time-domain attribute associated with the resource, and the time-domain attribute is hard, soft, and/or unavailable. In some embodiments, the method 2200 includes receiving 2204 a second configuration for the resource. The second configuration includes a second parameter indicating a frequency-domain attribute associated with the resource, and the frequency-domain attribute is hard, soft, and/or unavailable. In certain embodiments, the method 2200 includes determining 2206 an attribute for the resource based on the time-domain attribute and the frequency-domain attribute. The attribute is hard, soft, and/or unavailable. In various embodiments, the method 2200 includes, in response to determining that the attribute is soft: determining 2208 whether the resource is indicated as available; and, in response to determining that the resource is indicated as available, performing an operation on the resource. The operation is a downlink transmission and/or an uplink reception.

In certain embodiments: the attribute is determined to be hard in response to the time-domain attribute being hard and the frequency-domain attribute being hard; the attribute is determined to be soft in response to: the time-domain attribute being soft and the frequency-domain attribute being not unavailable; or the time-domain attribute being not unavailable and the frequency-domain attribute being soft; and the attribute is determined to be unavailable in response to the time-domain attribute being unavailable or the frequency-domain attribute being unavailable. In some embodiments: the attribute is determined to be hard in response to: the time-domain attribute being hard; or the time-domain attribute being soft and the frequency-domain attribute being hard; the attribute is determined to be soft in response to the time-domain attribute being soft and the frequency-domain attribute being soft; and the attribute is determined to be unavailable in response to: the time-domain attribute being unavailable; or the time-domain attribute being soft and the frequency-domain attribute being unavailable. In various embodiments, determining that the resource is indicated as available comprises determining that a time-domain availability indication, a frequency-domain availability indication, or a combination thereof indicates that the resource is available.

In one embodiment, the time-domain availability indication, the frequency-domain availability indication, or the combination thereof is received no later than a time threshold, the time threshold is determined based on a capability to perform decoding a first control message, encoding a second control message, transmitting the second control message, or some combination thereof. In certain embodiments, the method 2200 further comprises, in response to determining that the attribute is hard, performing the operation on the resource. In some embodiments, the method 2200 further comprises, in response to determining that the attribute is unavailable, refraining from performing the operation on the resource.

Figure 23:
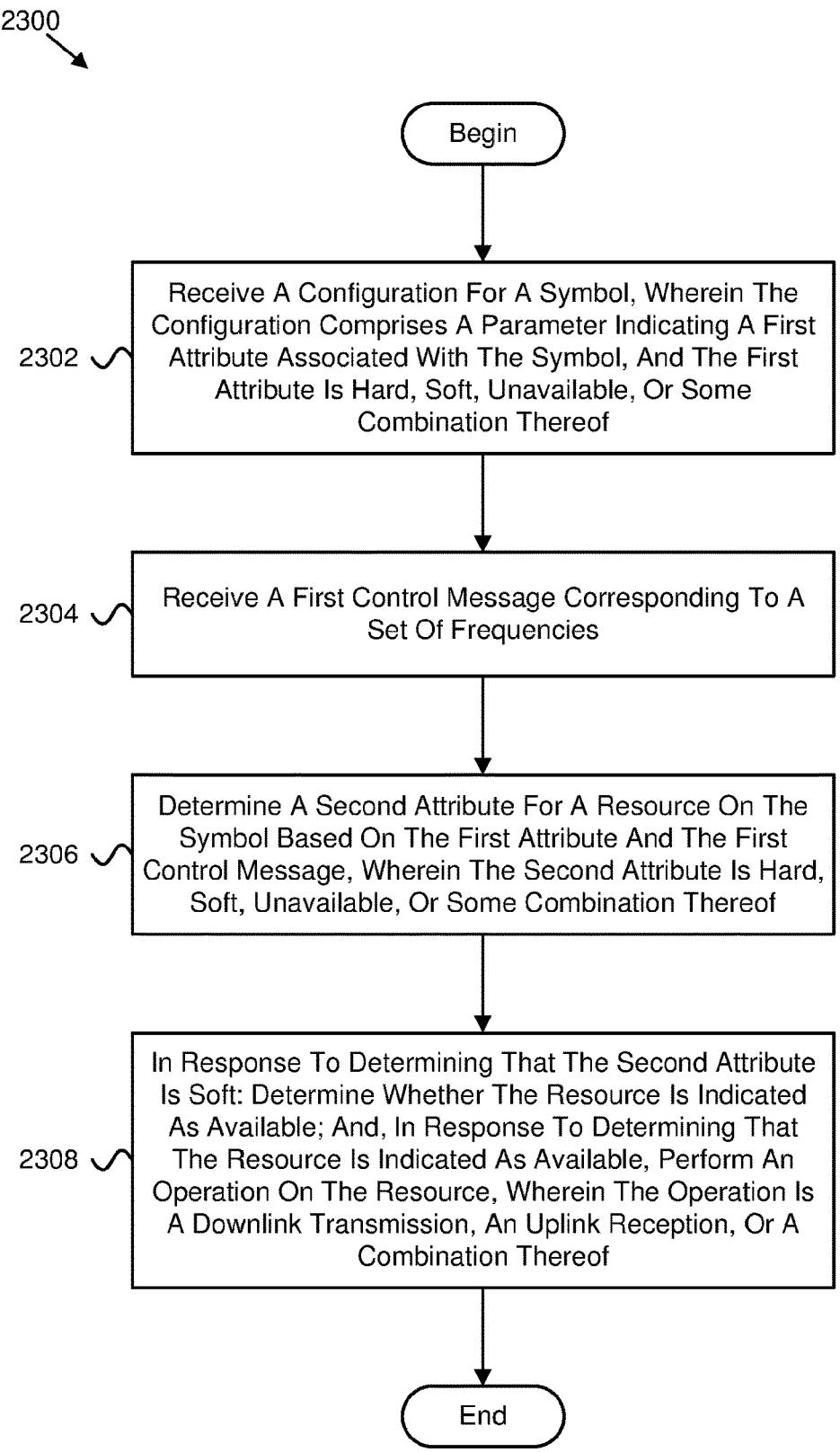
FIG. 23 is a flow chart diagram illustrating another embodiment of a method for resource attribute configuration.

FIG. 23 is a flow chart diagram illustrating another embodiment of a method 2300 for resource attribute configuration. In some embodiments, the method 2300 is performed by an apparatus, such as the remote unit 102. In certain embodiments, the method 2300 may be performed by a processor executing program code, for example, a microcontroller, a microprocessor, a CPU, a GPU, an auxiliary processing unit, a FPGA, or the like.

In various embodiments, the method 2300 includes receiving 2302 a configuration for a symbol. The configuration includes a parameter indicating a first attribute associated with the symbol, and the first attribute is hard, soft, and/or unavailable. In some embodiments, the method 2300 includes receiving 2304 a first control message corresponding to a set of frequencies. In various embodiments, the method 2300 includes determining 2306 a second attribute for a resource on the symbol based on the first attribute and the first control message. The second attribute is hard, soft, and/or unavailable. In certain embodiments, the method 2300 includes, in response to determining that the second attribute is soft: determining 2308 whether the resource is indicated as available; and, in response to determining that the resource is indicated as available, performing an operation on the resource. The operation is a downlink transmission and/or an uplink reception.

In certain embodiments: the second attribute is determined to be hard in response to the first attribute being hard; the second attribute is determined to be soft in response to the first attribute being soft and a frequency of the resource being in the set of frequencies; and the second attribute is determined to be unavailable in response to the first attribute being unavailable. In some embodiments, the method 2300 further comprises, in response to determining that the second attribute is hard, performing the operation on the resource. In various embodiments, the method 2300 further comprises, in response to determining that the second attribute is unavailable, refraining from performing the operation on the resource.

In one embodiment, a method comprises: receiving a first configuration for a resource, wherein the first configuration comprises a first parameter indicating a time-domain attribute associated with the resource, and the time-domain attribute is hard, soft, unavailable, or some combination thereof; receiving a second configuration for the resource, wherein the second configuration comprises a second parameter indicating a frequency-domain attribute associated with the resource, and the frequency-domain attribute is hard, soft, unavailable, or some combination thereof; determining an attribute for the resource based on the time-domain attribute and the frequency-domain attribute, wherein the attribute is hard, soft, unavailable, or some combination thereof; and, in response to determining that the attribute is soft: determining whether the resource is indicated as available; and, in response to determining that the resource is indicated as available, performing an operation on the resource, wherein the operation is a downlink transmission, an uplink reception, or a combination thereof.

In certain embodiments: the attribute is determined to be hard in response to the time-domain attribute being hard and the frequency-domain attribute being hard; the attribute is determined to be soft in response to: the time-domain attribute being soft and the frequency-domain attribute being not unavailable; or the time-domain attribute being not unavailable and the frequency-domain attribute being soft; and the attribute is determined to be unavailable in response to the time-domain attribute being unavailable or the frequency-domain attribute being unavailable.

In some embodiments: the attribute is determined to be hard in response to: the time-domain attribute being hard; or the time-domain attribute being soft and the frequency-domain attribute being hard; the attribute is determined to be soft in response to the time-domain is attribute being soft and the frequency-domain attribute being soft; and the attribute is determined to be unavailable in response to: the time-domain attribute being unavailable; or the time-domain attribute being soft and the frequency-domain attribute being unavailable.

In various embodiments, determining that the resource is indicated as available comprises determining that a time-domain availability indication, a frequency-domain availability indication, or a combination thereof indicates that the resource is available.

In one embodiment, the time-domain availability indication, the frequency-domain availability indication, or the combination thereof is received no later than a time threshold, the time threshold is determined based on a capability to perform decoding a first control message, encoding a second control message, transmitting the second control message, or some combination thereof.

In certain embodiments, the method further comprises, in response to determining that the attribute is hard, performing the operation on the resource.

In some embodiments, the method further comprises, in response to determining that the attribute is unavailable, refraining from performing the operation on the resource.

In one embodiment, an apparatus comprises: a receiver that: receives a first configuration for a resource, wherein the first configuration comprises a first parameter indicating a time-domain attribute associated with the resource, and the time-domain attribute is hard, soft, unavailable, or some combination thereof; and receives a second configuration for the resource, wherein the second configuration comprises a second parameter indicating a frequency-domain attribute associated with the resource, and the frequency-domain attribute is hard, soft, unavailable, or some combination thereof; and a processor that: determines an attribute for the resource based on the time-domain attribute and the frequency-domain attribute, wherein the attribute is hard, soft, unavailable, or some combination thereof; and, in response to determining that the attribute is soft: determines whether the resource is indicated as available; and, in response to determining that the resource is indicated as available, performs an operation on the resource, wherein the operation is a downlink transmission, an uplink reception, or a combination thereof.

In certain embodiments: the attribute is determined to be hard in response to the time-domain attribute being hard and the frequency-domain attribute being hard; the attribute is determined to be soft in response to: the time-domain attribute being soft and the frequency-domain attribute being not unavailable; or the time-domain attribute being not unavailable and the frequency-domain attribute being soft; and the attribute is determined to be unavailable in response to the time-domain attribute being unavailable or the frequency-domain attribute being unavailable.

In some embodiments: the attribute is determined to be hard in response to: the time-domain attribute being hard; or the time-domain attribute being soft and the frequency-domain attribute being hard; the attribute is determined to be soft in response to the time-domain attribute being soft and the frequency-domain attribute being soft; and the attribute is determined to be unavailable in response to: the time-domain attribute being unavailable; or the time-domain attribute being soft and the frequency-domain attribute being unavailable.

In various embodiments, the processor determining that the resource is indicated as available comprises the processor determining that a time-domain availability indication, a frequency-domain availability indication, or a combination thereof indicates that the resource is available.

In one embodiment, the time-domain availability indication, the frequency-domain availability indication, or the combination thereof is received no later than a time threshold, the time threshold is determined based on a capability to perform decoding a first control message, encoding a second control message, transmitting the second control message, or some combination thereof.

In certain embodiments, the processor, in response to determining that the attribute is hard, performs the operation on the resource.

In some embodiments, the processor, in response to determining that the attribute is unavailable, refrains from performing the operation on the resource.

In one embodiment, a method comprises: receiving a configuration for a symbol, wherein the configuration comprises a parameter indicating a first attribute associated with the symbol, and the first attribute is hard, soft, unavailable, or some combination thereof; receiving a first control message corresponding to a set of frequencies; determining a second attribute for a resource on the symbol based on the first attribute and the first control message, wherein the second attribute is hard, soft, unavailable, or some combination thereof; and, in response to determining that the second attribute is soft: determining whether the resource is indicated as available; and, in response to determining that the resource is indicated as available, performing an operation on the resource, wherein the operation is a downlink transmission, an uplink reception, or a combination thereof.

In certain embodiments: the second attribute is determined to be hard in response to the first attribute being hard; the second attribute is determined to be soft in response to the first attribute being soft and a frequency of the resource being in the set of frequencies; and the second attribute is determined to be unavailable in response to the first attribute being unavailable.

In some embodiments, the method further comprises, in response to determining that the second attribute is hard, performing the operation on the resource.

In various embodiments, the method further comprises, in response to determining that the second attribute is unavailable, refraining from performing the operation on the resource.

In one embodiment, an apparatus comprises: a receiver that: receives a configuration for a symbol, wherein the configuration comprises a parameter indicating a first attribute associated with the symbol, and the first attribute is hard, soft, unavailable, or some combination thereof; and receives a first control message corresponding to a set of frequencies; and a processor that: determines a second attribute for a resource on the symbol based on the first attribute and the first control message, wherein the second attribute is hard, soft, unavailable, or some combination thereof; and, in response to determining that the second attribute is soft: determines whether the resource is indicated as available; and, in response to determining that the resource is indicated as available, performs an operation on the resource, wherein the operation is a downlink transmission, an uplink reception, or a combination thereof.

In certain embodiments: the second attribute is determined to be hard in response to the first attribute being hard; the second attribute is determined to be soft in response to the first attribute being soft and a frequency of the resource being in the set of frequencies; and the second attribute is determined to be unavailable in response to the first attribute being unavailable.

In some embodiments, the processor, in response to determining that the second attribute is hard, performs the operation on the resource.

In various embodiments, the processor, in response to determining that the second attribute is unavailable, refrains from performing the operation on the resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication, the apparatus comprising an integrated access and backhaul (IAB) node, the apparatus further comprising:
   a processor; and
   a memory coupled to the processor, the processor configured to cause the apparatus to:
      receive a first configuration associated with a symbol, wherein the first configuration comprises a first indication of whether the symbol is hard, soft, or unavailable;
      receive a second configuration associated with a set of resource blocks (RBs) on the symbol, wherein the second configuration comprises a second indication of whether the set of RBs is hard, soft, or unavailable; and
      determine, for an IAB distributed unit (IAB-DU) of the IAB node, whether to perform a communication on the set of RBs in the symbol based at least in part on the first indication and the second indication.

2. The apparatus of claim 1, wherein the processor configured to further cause the apparatus to:
   receive a control message comprising a third indication that indicates available or unavailable; and
   determine, for the IAB-DU, whether to perform the communication on the set of RBs in the symbol further based on the third indication.

3. The apparatus of claim 2, wherein the IAB-DU is determined to perform the communication on the set of RBs in the symbol in response to:
   the first indication indicating that the symbol is soft;
   the second indication indicating that the set of RBs is soft; and
   the third indication indicating available.

4. The apparatus of claim 2, wherein the IAB-DU is determined not to perform the communication on the set of RBs in the symbol in response to:
   the first indication indicating that the symbol is soft;
   the second indication indicating that the set of RBs is soft; and
   the third indication indicating unavailable.

5. The apparatus of claim 2, wherein the control message comprises a bitmap field associated with a plurality of sets of RBs, the plurality of sets of RBs includes the set of RBs, and a bit in the bitmap field indicates whether the set of RBs is available.

6. The apparatus of claim 2, wherein the control message comprises an availability indication downlink control information (DCI) message from a parent node of the IAB node.

7. The apparatus of claim 1, wherein the communication is a transmission, a reception, or a combination thereof.

8. The apparatus of claim 1, wherein the first configuration is a time-domain configuration.

9. The apparatus of claim 1, wherein the second configuration is a frequency-domain configuration.

10. A method at an integrated access and backhaul (IAB) node, the method comprising:
    receiving a first configuration associated with a symbol, wherein the first configuration comprises a first indication of whether the symbol is hard, soft, or unavailable;

receiving a second configuration associated with a set of resource blocks (RBs) on the symbol, wherein the second configuration comprises a second indication of whether the set of RBs is hard, soft, or unavailable; and determining, for an IAB distributed unit (IAB-DU) of the IAB node, whether to perform a communication on the set of RBs in the symbol based at least in part on the first indication and the second indication.

11. The method of claim 10, further comprising:

receiving a control message comprising a third indication that indicates available or unavailable; and determining, for the IAB-DU, whether to perform the communication on the set of RBs in the symbol further based on the third indication.

12. The method of claim 11, wherein the IAB-DU is determined to perform the communication on the set of RBs in the symbol in response to:

the first indication indicating that the symbol is soft;
the second indication indicating that the set of RBs is soft; and
the third indication indicating available.

13. The method of claim 11, wherein the IAB-DU is determined not to perform the communication on the set of RBs in the symbol in response to:

the first indication indicating that the symbol is soft;
the second indication indicating that the set of RBs is soft; and
the third indication indicating unavailable.

14. The method of claim 11, wherein the control message comprises a bitmap field associated with a plurality of sets of RBs, the plurality of sets of RBs includes the set of RBs, and a bit in the bitmap field indicates whether the set of RBs is available.

15. The method of claim 10, wherein the communication is a transmission, a reception, or a combination thereof.

16. The method of claim 10, wherein the first configuration is a time-domain configuration.

17. The method of claim 10, wherein the second configuration is a frequency-domain configuration.

18. An apparatus for wireless communication, the apparatus comprising an integrated access and backhaul (IAB) node, the apparatus further comprising:

a processor; and a memory coupled with the processor, the processor configured to cause the apparatus to:

receive a time-domain configuration associated with a symbol, wherein the time-domain configuration comprises a first indication of whether the symbol is hard, soft, or unavailable;

receive a frequency-domain configuration associated with a set of resource blocks (RBs) on the symbol, wherein the frequency-domain configuration comprises a second indication of whether the set of RBs is hard, soft, or unavailable;

receive a control message comprising a third indication that indicates available or unavailable; and determine, for an IAB distributed unit (IAB-DU) of the IAB node, whether to perform a transmission, a reception, or a combination thereof on the set of RBs in the symbol based on the first indication, the second indication, and the third indication.

19. The apparatus of claim 18, wherein the IAB-DU is determined to perform the transmission, the reception, or the combination thereof on the set of RBs in the symbol in response to:

the first indication indicating that the symbol is soft;
the second indication indicating that the set of RBs is soft; and
the third indication indicating available.

20. The apparatus of claim 18, wherein the IAB-DU is determined not to perform the transmission, the reception, or the combination thereof on the set of RBs in the symbol in response to:

the first indication indicating that the symbol is soft;
the second indication indicating that the set of RBs is soft; and
the third indication indicating unavailable.

* * * * *